(12) United States Patent (10) Patent No.: US 12,641,607 B2
Chen et al. (45) Date of Patent: May 26, 2026

(54) METHOD AND APPARATUS FOR TRANSMITTING UPLINK CONTROL INFORMATION AND COMMUNICATION SYSTEM

(71) Applicant: 1FINITY Inc., Kawasaki (JP)

(72) Inventors: Zhe Chen, Beijing (CN); Lei Zhang, Beijing (CN); Jian Zhang, Beijing (CN); Qinyan Jiang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 608 days.

(21) Appl. No.: 18/105,016

(22) Filed: Feb. 2, 2023

(65) Prior Publication Data

US 2023/0180243 A1 Jun. 8, 2023

Related U.S. Application Data

(63) Continuation of application No. PCT/CN2020/107569, filed on Aug. 6, 2020.

(51) Int. Cl.
H04W 72/21 (2023.01)
H04L 5/00 (2006.01)
(Continued)

(52) U.S. Cl.
CPC ........... H04W 72/21 (2023.01); H04L 5/0012 (2013.01); H04W 72/0446 (2013.01); H04W 76/20 (2018.02)

(58) Field of Classification Search
CPC ... H04L 5/0035; H04L 5/0053; H04L 5/0012; H04W 72/21; H04W 72/0446; H04W 76/20
See application file for complete search history.

(56) References Cited

U.S. PATENT DOCUMENTS

2020/0007296 A1 1/2020 Papasakellariou
2020/0015229 A1 1/2020 Yang et al.
(Continued)

FOREIGN PATENT DOCUMENTS

CN 110784925 A 2/2020
CN 111262668 A 6/2020
(Continued)

OTHER PUBLICATIONS

Notifice of Reasons for Refusal issued by the Japan Patent Office for corresponding Japanese Patent Application No. 2023-506503, mailed on Oct. 22, 2024, with an English translation.
(Continued)

*Primary Examiner* — Brian D Nguyen
(74) *Attorney, Agent, or Firm* — Myers Wolin, LLC

(57) ABSTRACT

A method and apparatus for transmitting uplink control information and a communication system. The method includes a terminal equipment transmits uplink control information, the uplink control information being related to at least two TRPs. The uplink control information is transmitted in a manner of spatial diversity. At the terminal side, the same data may reach a network side via different spatial domain paths or via different TRPs (transmission and reception points). In a case where blockage occurs in a path, other paths may still continue to operate, thereby ensuring high reliability of the uplink control information. The number of retransmissions of the uplink control information may be avoided or reduced, thereby lowering transmission latency of uplink data.

19 Claims, 17 Drawing Sheets

┌─ 1303
the terminal equipment receives indication information transmitted by the network device, the indication information indicating that the uplink control information is related to at least two TRPs ┌─ 1302
The terminal equipment generates the sequence corresponding to the uplink control information according to the at least two TRPs ┌─ 1301
a terminal equipment transmits control information, the uplink control information (PUCCH) being related to at least two TRPs

(51) Int. Cl.
    *H04W 72/0446*       (2023.01)
    *H04W 76/20*          (2018.01)

(56)                References Cited

U.S. PATENT DOCUMENTS

| | | | | |
|---|---|---|---|---|
| 2020/0092068 | A1 | 3/2020 | Yang et al. | |
| 2020/0107235 | A1* | 4/2020 | Peisa ................... | H04B 7/0617 |
| 2020/0205142 | A1* | 6/2020 | Gao ...................... | H04L 5/0053 |
| 2020/0205150 | A1 | 6/2020 | Cheng et al. | |
| 2020/0328849 | A1* | 10/2020 | Noh ..................... | H04L 1/1812 |
| 2020/0351916 | A1* | 11/2020 | Khoshnevisan ....... | H04B 7/024 |
| 2021/0153188 | A1 | 5/2021 | Wang et al. | |
| 2023/0048329 | A1* | 2/2023 | Kang ................... | H04L 5/0048 |

FOREIGN PATENT DOCUMENTS

| | | | | |
|---|---|---|---|---|
| CN | 111278114 | A | 6/2020 | |
| EP | 4002933 | A1 * | 5/2022 | ........... H04L 5/0023 |
| EP | 4002934 | A1 * | 5/2022 | ........... H04B 7/0456 |
| WO | 2017/197118 | A1 | 11/2017 | |
| WO | 2020/066021 | A1 | 4/2020 | |

OTHER PUBLICATIONS

First Notification of Office Action and Search Report issued by the China National Intellectual Property Administration for corresponding Chinese Patent Application No. 202080103008.4, mailed on Feb. 26, 2025, with an English translation.

Notice of Reasons for Refusal issued by the Japan Patent Office for corresponding Japanese Patent Application No. 2023-506503, mailed on Jan. 16, 2024, with an English translation.

NTT Docomo, Inc, "Enhancements on multi-TRP/panel transmission", Agenda Item: 7.2.8.2, 3GPP TSG-RAN WG1 Ad-Hoc Meeting 1901, R1-19000978, Taipei, Jan. 21-25, 2019.

Vivo, "Design of long-PUCCH over multiple slots", Agenda Item: 7.3.2.2.3, 3GPP TSG-RAN WG1 Meeting #90bis, R1-1717494, Prague, Czech Republic, Oct. 9-13, 2017.

International Search Report and Written Opinion of the International Searching Authority issued by the China National Intellectual Property Administration for corresponding International Patent Application No. PCT/CN2020/107569, mailed on May 7, 2021, with an English translation.

Vivo, "Discussion on Enhancements on Multi-TRP/Panel Transmission", Agenda Item: 7.2.8.2, 3GPP TSG-RAN WG1 Meeting #95, R1-1812323, Spokane, US, Nov. 12-16, 2018.

AT&T, "Single and Multi DCI NC-JT Framework for Multi TRP Transmission in NR", Agenda Item: 8.1.2.1, 3GPP TSG-RAN WG1 Meeting #88, R1-1702259, Athens, Greece, Feb. 13-17, 2017.

ZTE et al., "Multi-TRP transmission for NR", Agenda Item: 7.1.3.1, 3GPP TSG-RAN WG1 Meeting #87, R1-1613106, Reno, USA, Nov. 14-18, 2016.

The partial supplementary European search report issued by the European Patent Office for corresponding European Patent Application No. 20948674.5-1213, mailed on Sep. 19, 2023.

* cited by examiner

PUCCH format 1

L = 12 symbols
Intra_slot_FH = 'off'
Inter_slot_FH = 'off'
Rep = 1
Info bits <= 2

▨ DM-RS

▨ UCI

PUCCH format 1

L = 12 symbols
Intra_slot_FH = 'on'
Inter_slot_FH = 'off'
Rep = 1
Info bits <= 2

▨ DM-RS

▨ UCI

PUCCH format 1

L = 4 symbols
Intra_slot_FH = 'off'
Inter_slot_FH = 'off'
Rep = 4
Info bits <= 2

▓ DM-RS
░ UCI

PUCCH format 1

L = 4 symbols
Intra_slot_FH = 'off'
Inter_slot_FH = 'on'
Rep = 4
Info bits <= 2

▓ DM-RS
░ UCI

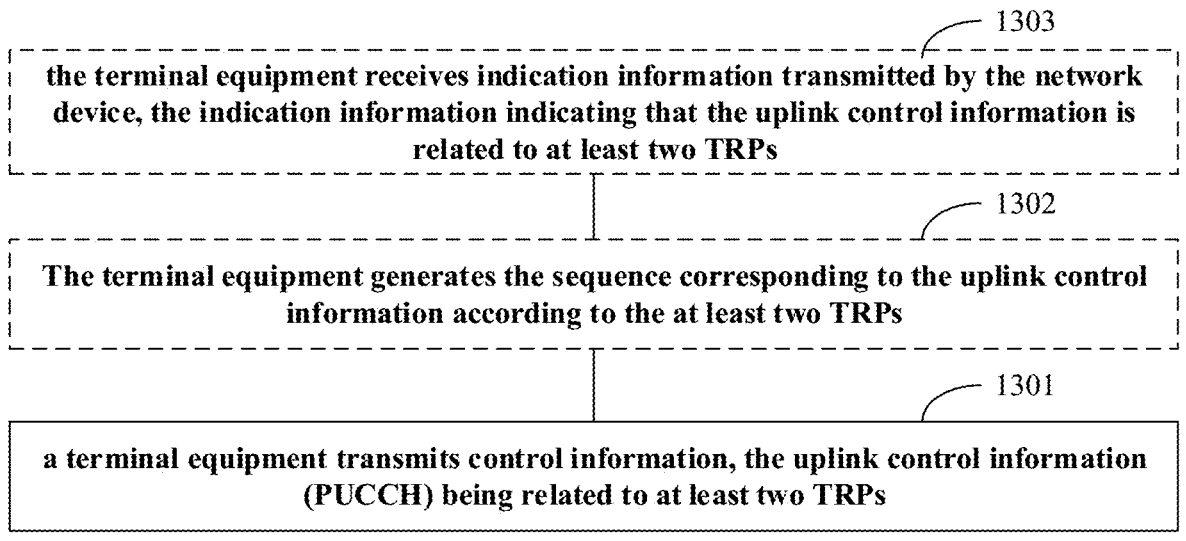

1303 the terminal equipment receives indication information transmitted by the network device, the indication information indicating that the uplink control information is related to at least two TRPs

1302

The terminal equipment generates the sequence corresponding to the uplink control information according to the at least two TRPs

1301 a terminal equipment transmits control information, the uplink control information (PUCCH) being related to at least two TRPs

FIG. 13

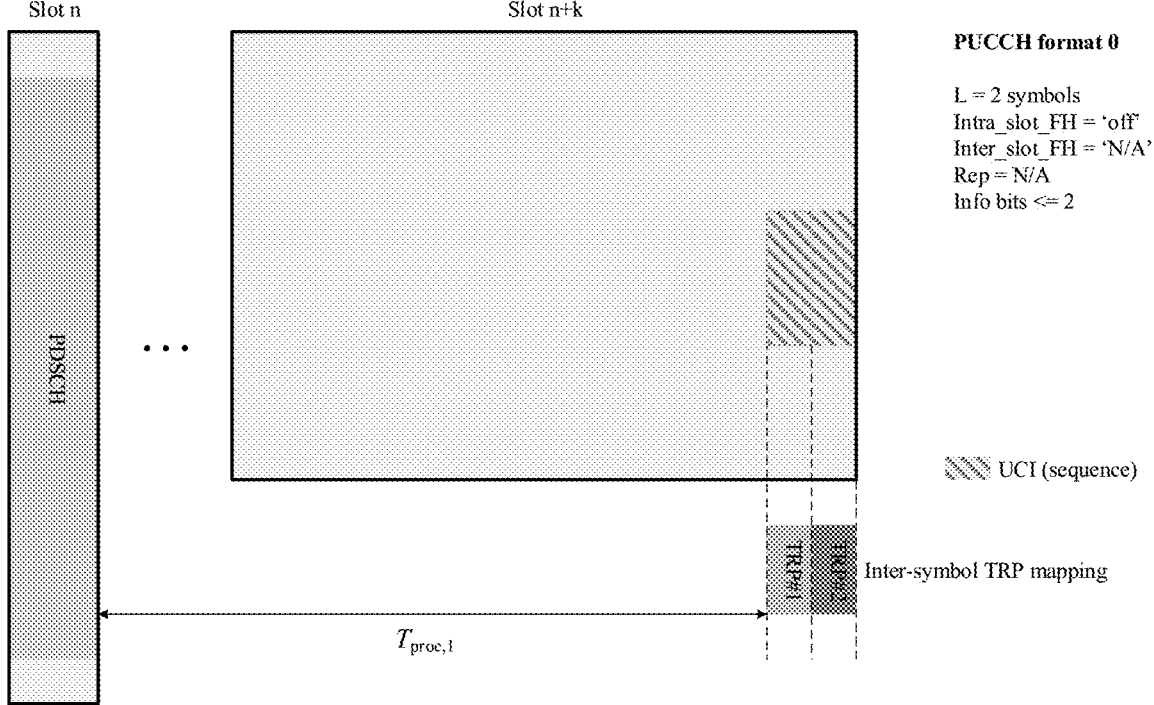

Slot n

Slot n+k

PUCCH

PDSCH $T_{proc,1}$

PUCCH format 0

L = 2 symbols
Intra_slot_FH = 'off'
Inter_slot_FH = 'N/A'
Rep = N/A
Info bits <= 2

UCI (sequence)

Inter-symbol TRP mapping

FIG. 14

PUCCH format 2

L = 2 symbols
Intra_slot_FH = 'off'
Inter_slot_FH = 'N/A'
Rep = N/A
Info Bit > 2

DM-RS

UCI

PUCCH format 3

L = 12 symbols
Intra_slot_FH = 'off'
Inter_slot_FH = 'off'
Rep = 1
Info Bit > 2

DM-RS

UCI 2901
a network device transmits indication information to a terminal equipment, the indication information indicating that uplink control information is related to at least two TRPs
FIG. 29
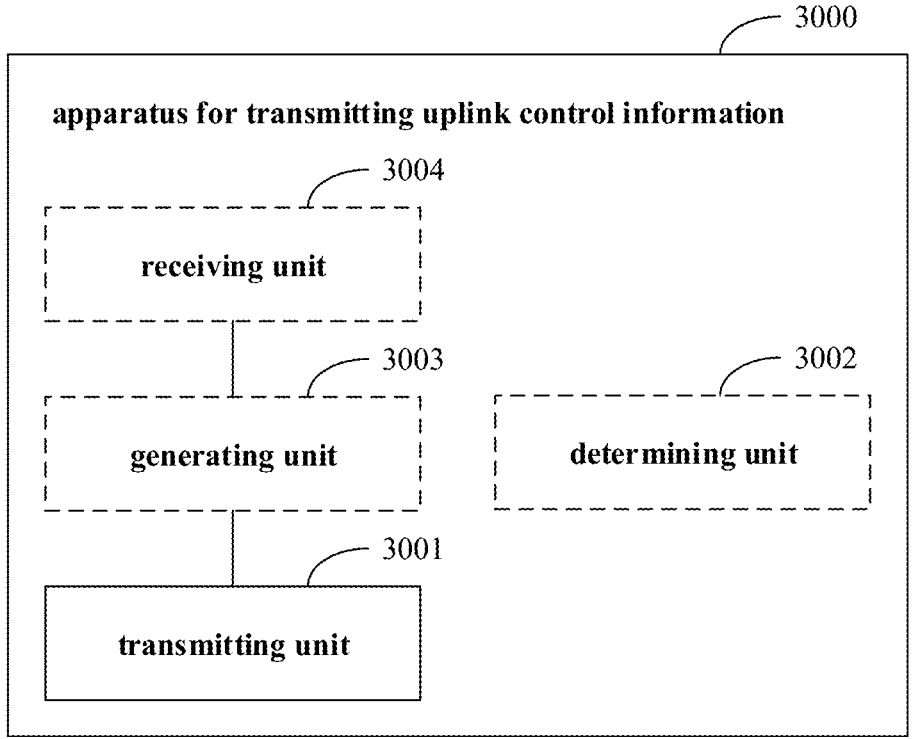
FIG. 30
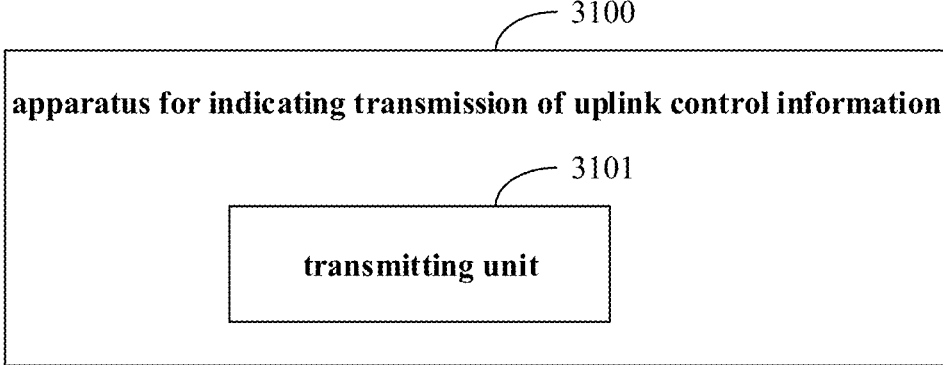
FIG. 31

3200

3201

3202

METHOD AND APPARATUS FOR TRANSMITTING UPLINK CONTROL INFORMATION AND COMMUNICATION SYSTEM

CROSS-REFERENCE TO RELATED APPLICATION

This application is a continuation application of International Application PCT/CN2020/107569 filed on Aug. 6, 2020 and designated the U.S., the entire contents of which are incorporated herein by reference.

FIELD

This disclosure relates to the field of communications.

BACKGROUND

In order to meet requirements of both reliability and coverage, NR (New Radio) introduces multiple uplink control channel formats (PUCCH formats) to deal with different scenarios. In addition, NR introduces a flexible uplink information transmission mechanism to improve the system performance.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that NR supports a carrier frequency up to 52.6 GHz. When the carrier frequency is relatively high, a high-frequency signal is easily blocked by obstacles due to its poor diffraction ability. When a transmission signal is blocked, transmission channel quality is seriously degraded, thereby resulting in reduction of reliability of a transmission signal and/or increase of transmission latency. This is very unfavorable for URLLC (ultra reliable low latency communications) services. This is because a communication latency requirement of URLLC is generally less than 3 milliseconds, and if a transmission channel of uplink control information is blocked by an obstacle, according to an existing mechanism, its latency is unable to satisfy requirements of URLLC services.

In order to reduce the impact of the instability of the high-frequency transmission channel on the uplink control information transmission, embodiments of this disclosure provide a method and apparatus for transmitting uplink control information and a communication system, so that uplink control information may be transmitted in a manner of spatial diversity (that is, transmitted to different TRPs), thereby enhancing reliability of uplink control information transmission, and efficiently lowering impact of instability of channels on transmission latency.

According to an aspect of the embodiments of this disclosure, there is provided a method for transmitting uplink control information, the method including:

a terminal equipment transmits uplink control information, the uplink control information being related to at least two TRPs.

According to another aspect of the embodiments of this disclosure, there is provided a method for indicating transmission of uplink control information, the method including:

a network device transmits indication information to a terminal equipment, the indication information indicating that uplink control information is related to at least two TRPs.

According to a further aspect of the embodiments of this disclosure, there is provided an apparatus for transmitting uplink control information, the apparatus including:

a transmitting unit configured to transmit uplink control information, the uplink control information being related to at least two TRPs.

According to still another aspect of the embodiments of this disclosure, there is provided an apparatus for indicating transmission of uplink control information, the apparatus including:

a transmitting unit configured to transmit indication information to a terminal equipment, the indication information indicating that uplink control information is related to at least two TRPs.

An advantage of the embodiments of this disclosure exists in that according to the embodiments of this disclosure, the uplink control information is transmitted in a manner of spatial diversity. That is, at the terminal side, the same data may reach a network side via different spatial domain paths or via different TRPs (transmission and reception points). Hence, in a case where blockage occurs in some paths, other paths may still continue to operate, thereby ensuring high reliability of the uplink control information. And furthermore, as the method may make use of spatial diversity gains, the number of retransmissions of the uplink control information may be avoided or reduced, thereby lowering transmission latency of uplink data.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 13 is a schematic diagram of the method for transmitting uplink control information of an embodiment of this disclosure;

FIG. 14 is a schematic diagram of an example of a mapping relation between PUCCH format 0 and TRPs;

FIG. 29 is a schematic diagram of the method for indicating transmission of uplink control information of an embodiment of this disclosure;

FIG. 30 is a schematic diagram of the apparatus for transmitting uplink control information of an embodiment of this disclosure;

FIG. 31 is a schematic diagram of the apparatus for indicating transmission of uplink control information of an embodiment of this disclosure;

DETAILED DESCRIPTION

Figure 1:
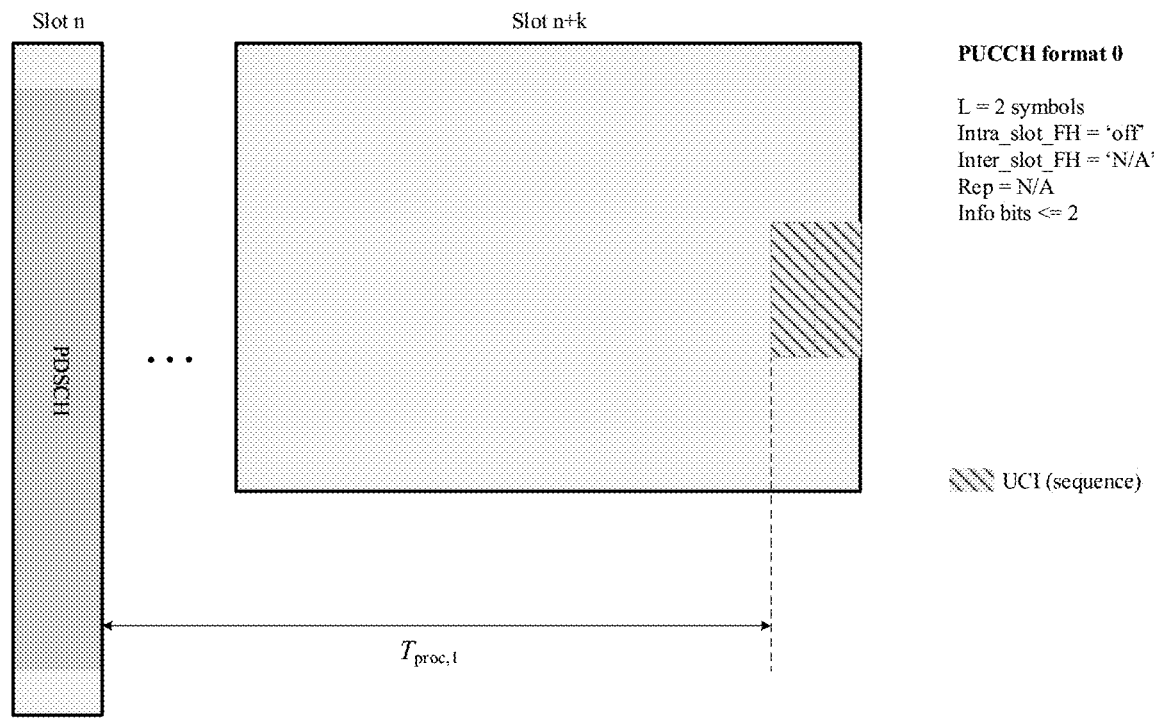
FIG. 1 is schematic diagram of an example of PUCCH format 0.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In order to make the embodiments of this disclosure clear and understandable, some concepts and definitions involved in the embodiments of this disclosure are explained below.

In the embodiments of this disclosure, PUCCH format 0 is a short PUCCH (physical uplink control channel), its length may be of 1 or 2 time domain symbols, and a frequency domain bandwidth occupied by it is of 1 PRB (physical resource block). For each symbol, PUCCH format 0 is consists of a low PAPR (peak-to-average power ratio) sequence of a length of 12, which carries 1 or 2 UCI (uplink control information) bits. Compared with PUCCH format 0 of 1 symbol, PUCCH format 0 of 2 symbols includes two low PAPR sequences of a length of 12, each sequence corresponding to identical information bits. Therefore, compared with PUCCH format 0 of 1 symbol, PUCCH format 0 of 2 symbols also carries 1 or 2 UCI bits; however, as its time domain length is relatively long, it may accumulate higher energy at a receiving side, thereby enhancing coverage.

It should be further noted that PUCCH format 0 supports intra-slot frequency hopping (also known as intra-slot frequency hopping), which enables PUCCHs to use frequency domain diversity gains on uplink bandwidths with larger scheduling bandwidths to improve reliability.

FIG. 1 is a schematic diagram of an example of PUCCH format 0. As shown in FIG. 1, after a UE receives a UE-specific PDSCH (UE-specific physical downlink shared channel), it needs to feed back corresponding HARQ-ACK (hybrid automatic repeat request acknowledgement).

Therefore, after $T_{proc,1}$, PUCCH format 0 is used to transmit corresponding HARQ-ACK feedback; where, a time domain length L of PUCCH format 0 is of 2 symbols, and $T_{proc,1}$ is a UE PDSCH processing procedure time.

Figure 2:
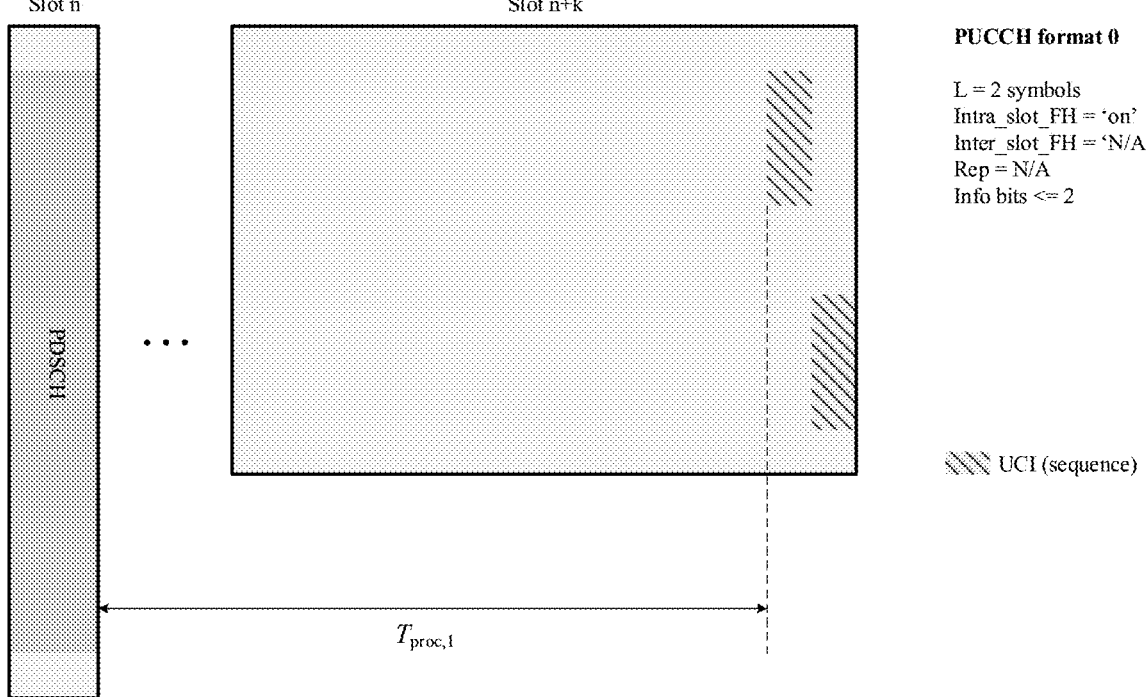
FIG. 2 is a schematic diagram of another example of PUCCH format 0.

FIG. 2 is a schematic diagram of another example of PUCCH format 0. In the example of FIG. 2, intra-slot frequency hopping occurs. The example of FIG. 2 is similar to the example of FIG. 1, with a difference that in the example of FIG. 2, a first symbol and a second symbol of PUCCH format 0 occupy different frequency domain resources.

In the embodiments of this disclosure, PUCCH format 1 is a long PUCCH, its length may be of 4-14 time domain symbols, and a frequency domain bandwidth occupied by it is of 1 PRB. PUCCH format 1 adopts a structure of time division multiplexing of a DM-RS and UCI to obtain higher reliability. The entire PUCCH format 1 carries one or two UCI bits. By configuring the time domain length of the PUCCH, coverage requirements of different scenarios may be satisfied.

It should be further noted that PUCCH format 1 supports inter-UE resource reuse, that is, it supports different UEs to use different time domain orthogonal cover codes (TD-OCCs) for PUCCH format 1 to reuse identical time-frequency resources. PUCCH format 1 also supports time domain repetitions, that is, slot-based time domain repetitions. This repetition mode is conducive to a receiver end in acquiring additional signal energies and further enhancing coverage. PUCCH format 1 also supports intra-slot frequency hopping, which enables PUCCHs to use frequency diversity gain to improve reliability. PUCCH format 1 also supports inter-slot frequency hopping, and this mode enables the PUCCH to use frequency diversity gains to improve reliability.

Figure 3:
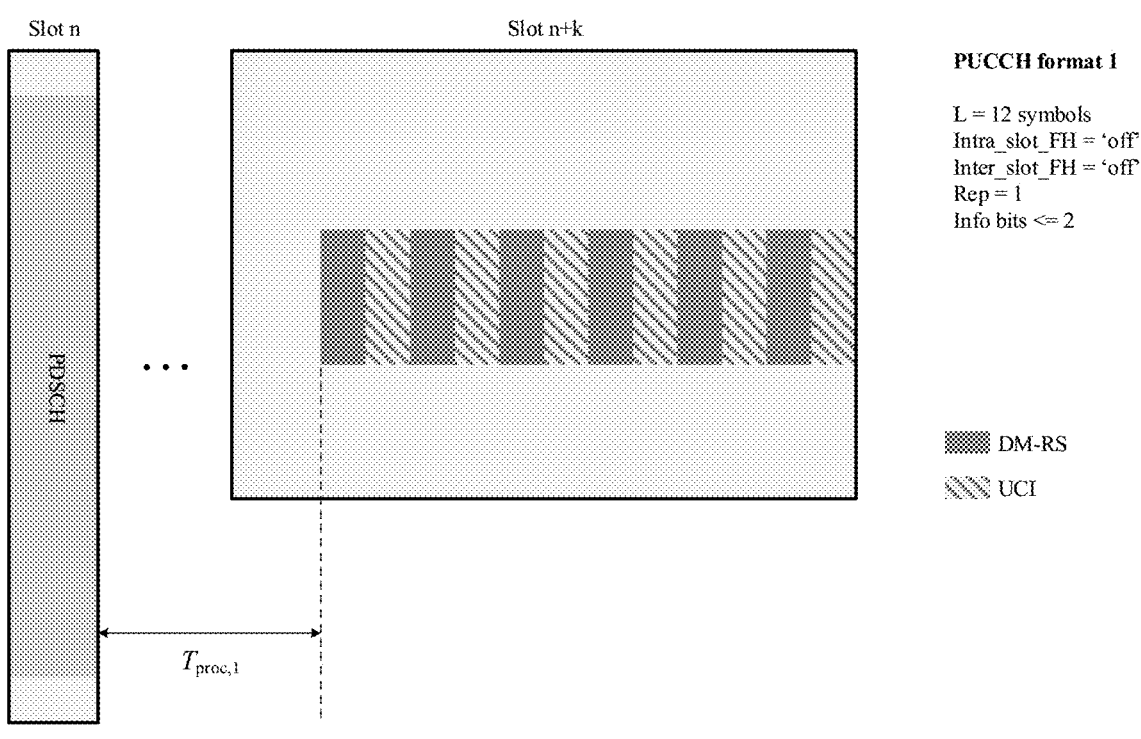
FIG. 3 is a schematic diagram of an example of PUCCH format 1.

FIG. 3 is a schematic diagram of an example of PUCCH format 1. As shown in FIG. 3, after a UE receives a UE-specific PDSCH, it needs to feed back corresponding HARQ-ACK. Therefore, after $T_{proc,1}$, PUCCH format 1 is used to transmit corresponding HARQ-ACK feedback. A time domain length L of PUCCH format 1 is of 12 symbols. The length of an orthogonal cover code corresponding to a DM-RS is identical to the number of symbols occupied by the DM-RS, that is, the DM-RS occupies 6 symbols, and a length of its time domain orthogonal cover code is also 6; likewise, the length of an orthogonal cover code corresponding to UCI is identical to the number of symbols occupied by the UCI, that is, the UCI occupies 6 symbols, and a length of its time domain orthogonal cover code is also 6.

Figure 4:
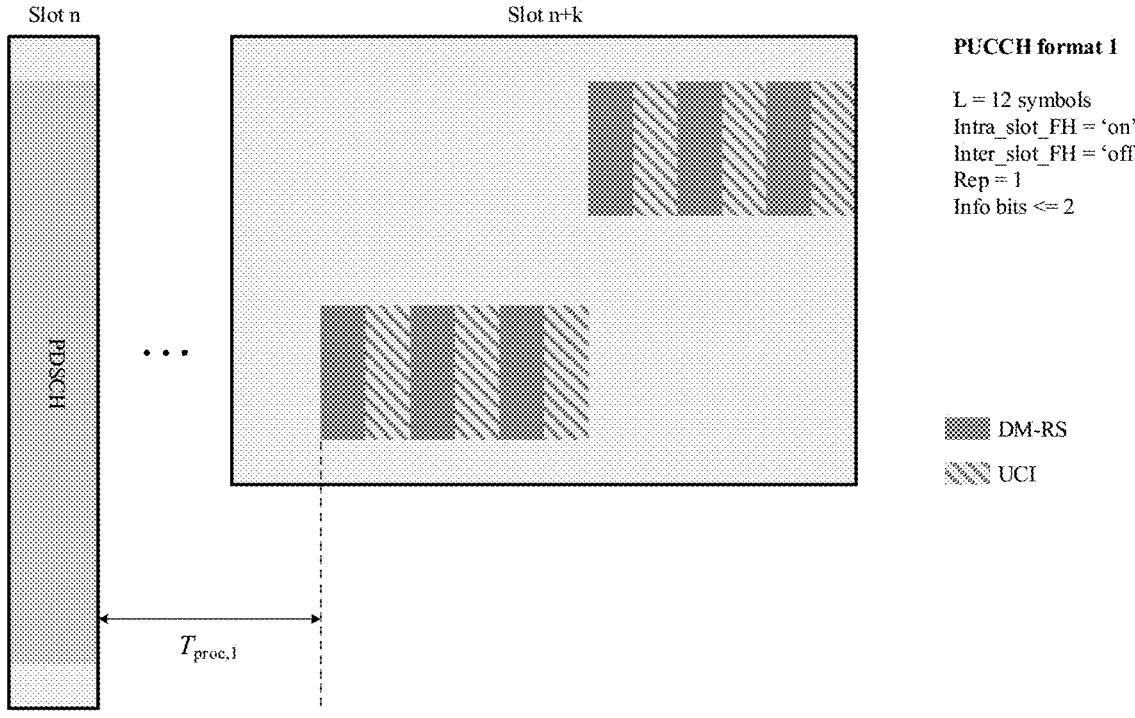
FIG. 4 is a schematic diagram of another example of PUCCH format 1.

FIG. 4 is a schematic diagram of another example of PUCCH format 1. In the example of FIG. 4, intra-slot frequency hopping occurs. The example of FIG. 4 is similar to the example of FIG. 3, with a difference that in the example of FIG. 4, the former half and the latter half of PUCCH format 1 occupy different frequency domain resources (the former half and the latter half correspond to two hops respectively). In a first hop, the DM-RS occupies 3 symbols, and the length of its time domain orthogonal cover code is also 3; and in a second hop, the DM-RS occupies 3 symbols, and the length of its time domain orthogonal cover code is also 3. Likewise, the length of an orthogonal cover code corresponding to the UCI is identical to the number of symbols occupied by the UCI in each hop, that is, in the first hop, the UCI occupies 3 symbols, and the length of its time domain orthogonal cover code is also 3; and in the second hop, the UCI occupies 3 symbols, and the length of its time domain orthogonal cover code is also 3.

Figure 5:
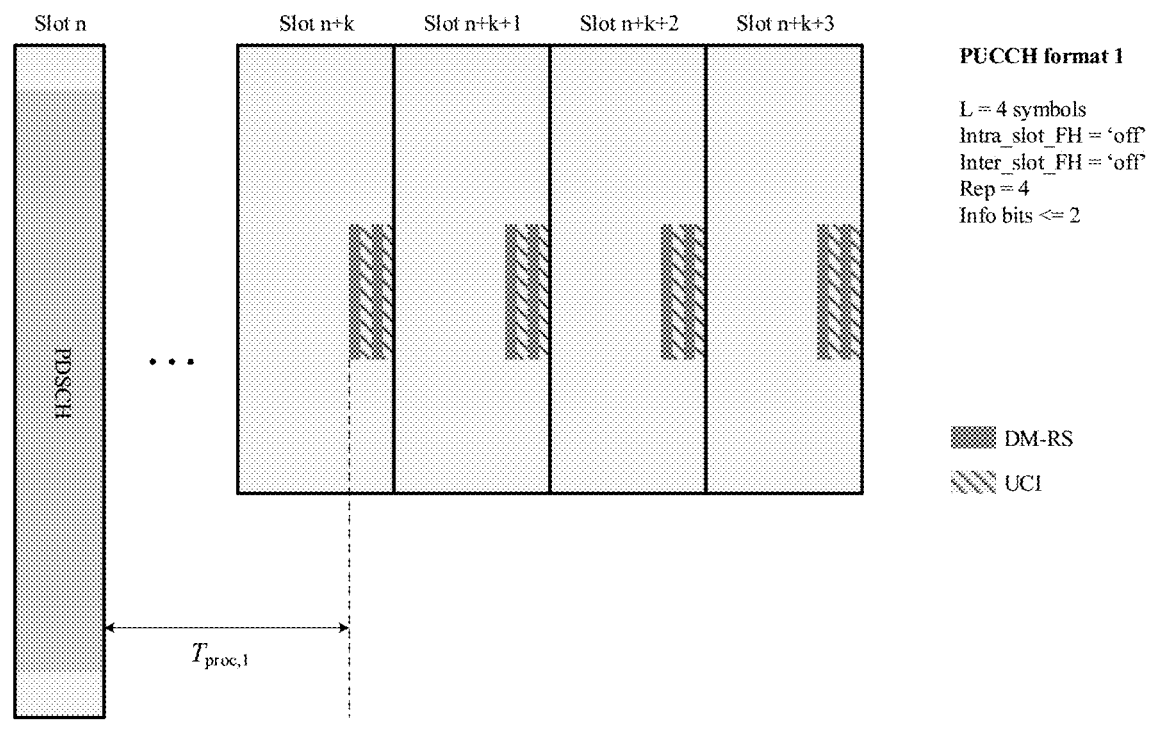
FIG. 5 is a schematic diagram of a further example of PUCCH format 1.

FIG. 5 is a schematic diagram of a further example of PUCCH format 1, showing a case of time domain repetition of a PUCCH. As shown in FIG. 5, after the UE receives a UE-specific PDSCH, it needs to feed back corresponding HARQ-ACK. Therefore, after $T_{proc,1}$, PUCCH format 1 is used to transmit corresponding HARQ-ACK feedback in a slot n+k. A time domain length L of PUCCH format 1 is of 12 symbols, and the number of repetitions is 4. The PUCCH repetitions are in 4 consecutive slots starting from the slot n+k; and in each slot, time-frequency resources occupied by the PUCCH repetitions are identical.

Figure 6:
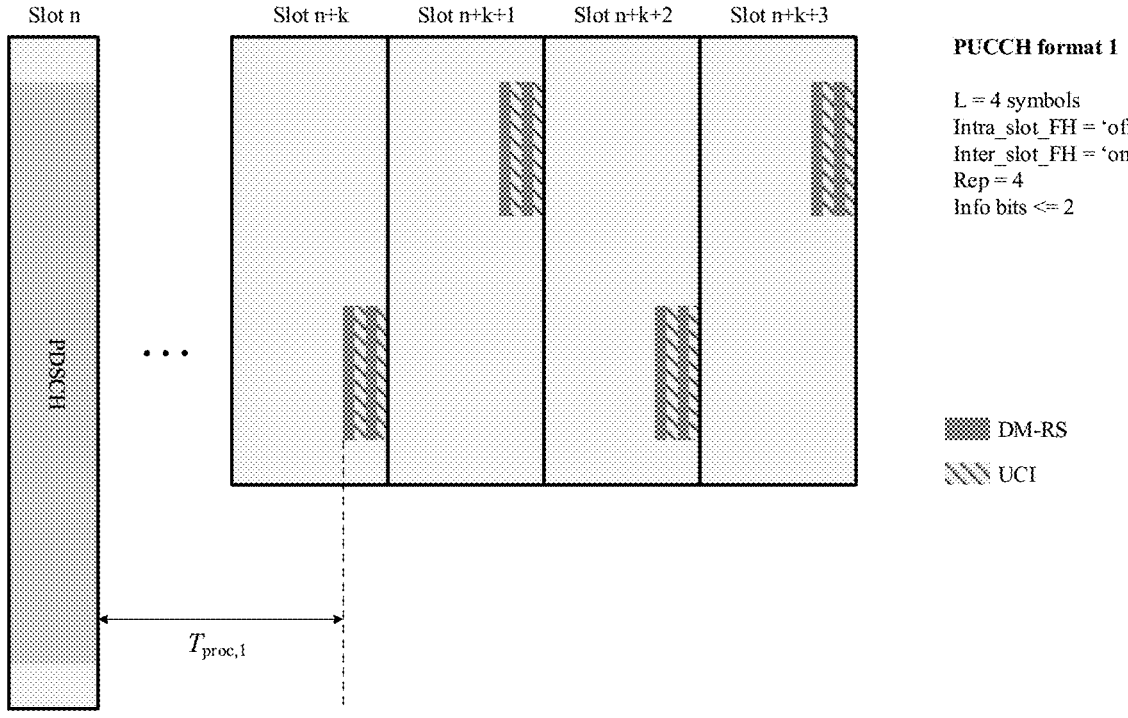
FIG. 6 is a schematic diagram of still another example of PUCCH format 1.

FIG. 6 is a schematic diagram of still another example of PUCCH format 1. In the example of FIG. 6, inter-slot frequency hopping occurs. The example of FIG. 6 is similar to the example of FIG. 5, with a difference that in the example of FIG. 6, PUCCH repetitions of PUCCH format 1 alternately occupy different frequency domain resources in different slots.

It should be further noted that a PUCCH in which time domain repetitions occurs may also perform intra-slot frequency hopping. In each slot, reference may be made to FIG. 4 for a mode of the frequency hopping, which shall not be described herein any further.

In the embodiments of this disclosure, PUCCH format 2 is a short PUCCH, its length may be of 1 or 2 time domain symbols, and a frequency domain bandwidth occupied by it is of 1-16 PRBs. PUCCH format 2 adopts a structure of frequency division multiplexing of a DM-RS and UCI to carry more UCI bits. The UCI bits carried by the entire PUCCH format 2 is greater than 2, which may transmit a large number of UCI bits in a short time to reduce UCI feedback latency.

It should be further noted that PUCCH format 2 supports intra-slot frequency hopping, and such a mode enables a PUCCH to use frequency domain diversity gains to improve reliability.

Figure 7:
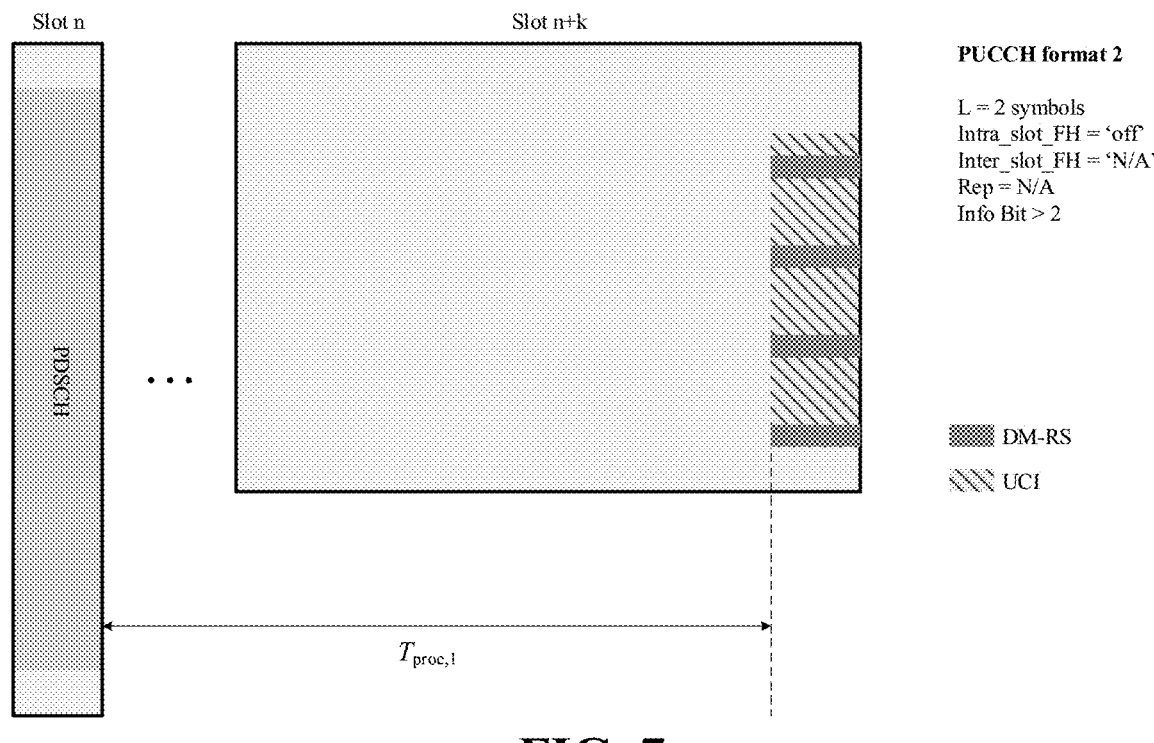
FIG. 7 is a schematic diagram of an example of PUCCH format 2.

FIG. 7 is a schematic diagram of an example of PUCCH format 2. As shown in FIG. 7, after a UE receives a UE-specific PDSCH, it needs to feed back corresponding HARQ-ACK. Therefore, after $T_{proc,1}$, PUCCH format 2 is used to transmit corresponding HARQ-ACK feedback. A time domain length L of PUCCH format 2 is of 2 symbols.

Figure 8:
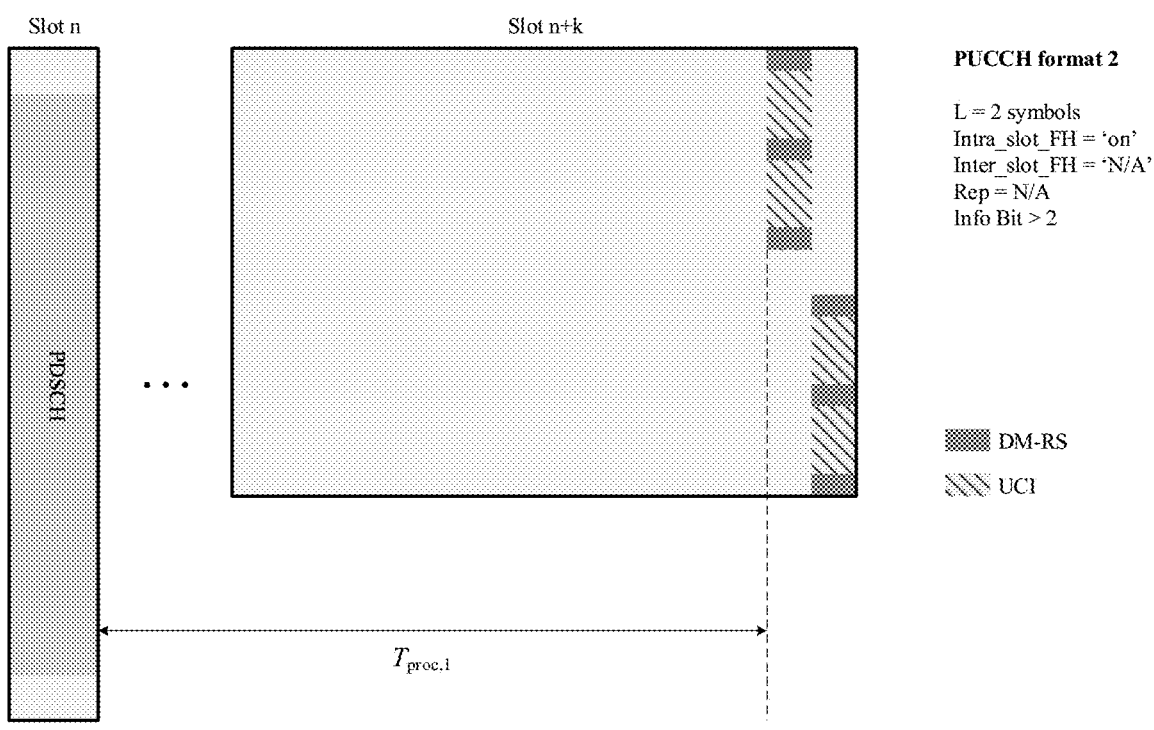
FIG. 8 is a schematic diagram of another example of PUCCH format 2.

FIG. 8 is a schematic diagram of another example of PUCCH format 2. In the example of FIG. 8, intra-slot frequency hopping occurs. The example of FIG. 8 is similar to the example of FIG. 7, with a difference that in the example of FIG. 8, a first symbol and a second symbol of PUCCH format 2 occupy different frequency domain resources.

In the embodiments of this disclosure, PUCCH format 3 is a long PUCCH, and its length may be of 4-14 time domain symbols. A frequency domain bandwidth occupied by PUCCH format 3 may be of 1-16 PRBs. PUCCH format 3 adopts a structure of time division multiplexing of a DM-RS and UCI. The number of UCI bits carried by the entire PUCCH format 3 is greater than 2. As a relatively long time domain resource may be occupied, PUCCH format 3 is able to transmit a large number of UCI bits while ensuring coverage.

It should be further noted that PUCCH format 3 supports time domain repetitions, i.e. slot-based time domain repetitions. This repetition mode is conducive to a receiver end in acquiring additional signal energies and further enhancing coverage. PUCCH format 3 also supports intra-slot frequency hopping, which enables PUCCHs to use frequency domain diversity gains to improve reliability. PUCCH format 3 also supports inter-slot frequency hopping, and this mode enables the PUCCHs to use frequency domain diversity gains to improve reliability.

Figure 9:
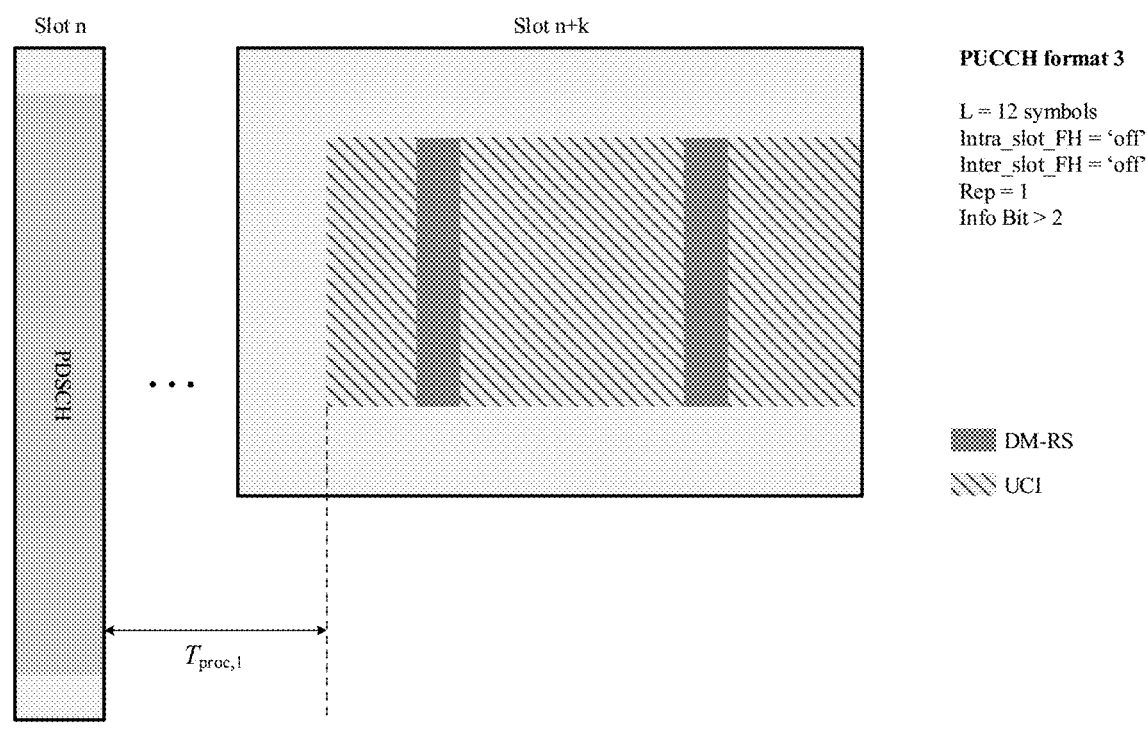
FIG. 9 is a schematic diagram of an example of PUCCH format 3.

FIG. 9 is a schematic diagram of an example of PUCCH format 3. As shown in FIG. 9, after a UE receives a UE-specific PDSCH, it needs to feed back corresponding HARQ-ACK. Therefore, after $T_{proc,1}$, PUCCH format 3 is used to transmit corresponding HARQ-ACK feedback (also including other UCI bits transmitted in the same slot). A time domain length L of PUCCH format 3 is of 12 symbols.

Figure 10:
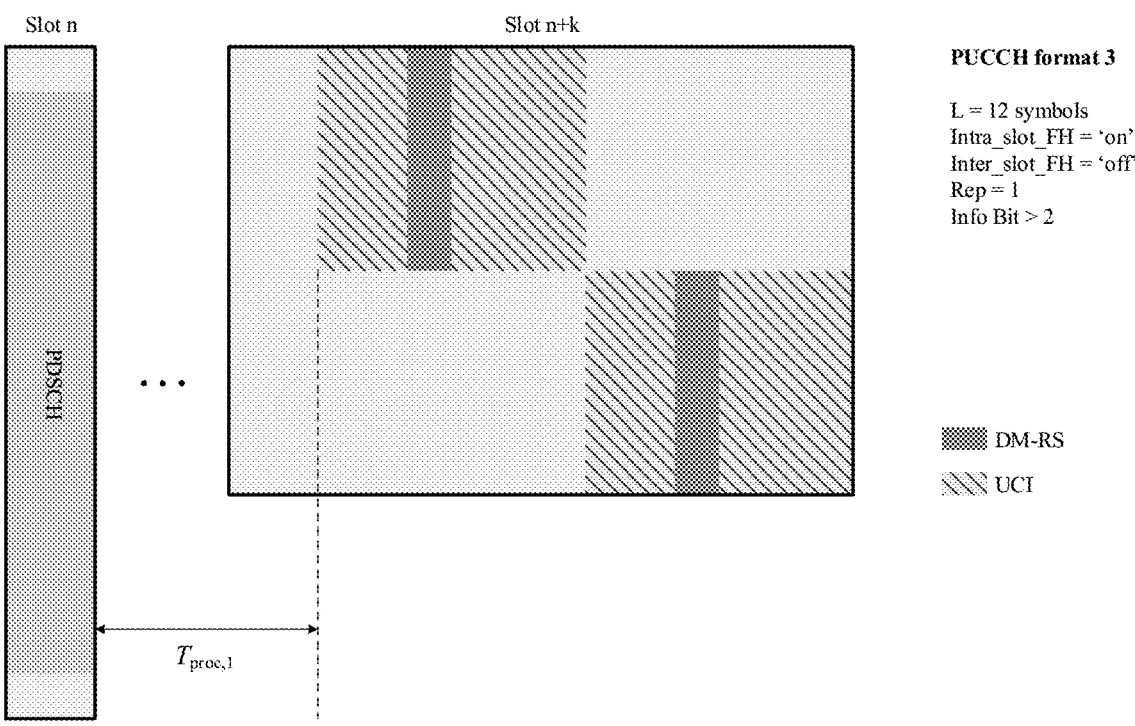
FIG. 10 is a schematic diagram of another example of PUCCH format 3.

FIG. 10 is a schematic diagram of another example of PUCCH format 3. In the example of FIG. 10, intra-slot frequency hopping occurs. The example of FIG. 10 is similar to the example of FIG. 9, with a difference that in the example of FIG. 10, the former half and the latter half of PUCCH format 3 occupy different frequency domain resources.

Figure 11:
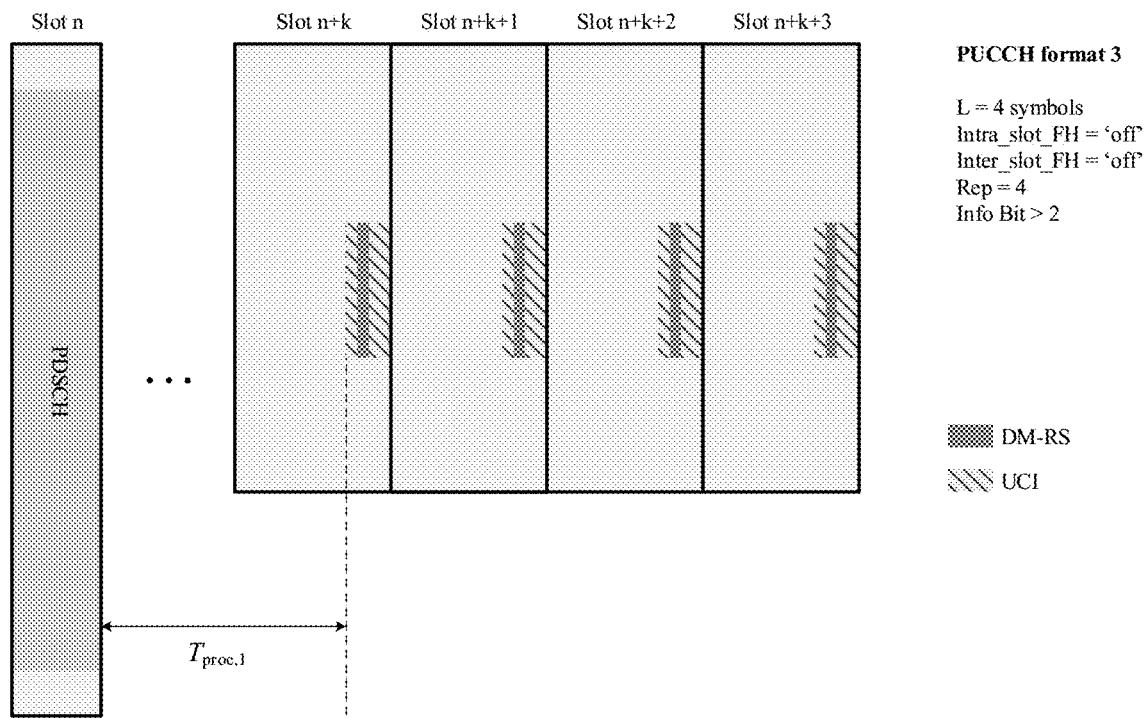
FIG. 11 is a schematic diagram of a further example of PUCCH format 3.

FIG. 11 is a schematic diagram of a further example of PUCCH format 3, showing a case of PUCCH repetition in time domain. As shown in FIG. 11, after the UE receives a UE-specific PDSCH, it needs to feed back corresponding HARQ-ACK. Therefore, after $T_{proc,1}$, PUCCH format 3 is used to transmit corresponding HARQ-ACK feedback in a slot n+k. A time domain length L of PUCCH format 3 is of 4 symbols, and the number of repetitions is 4. The PUCCH repetitions are in 4 consecutive slots starting from the slot n+k; and in each slot, time-frequency resources occupied by the PUCCH repetitions are identical.

Figure 12:
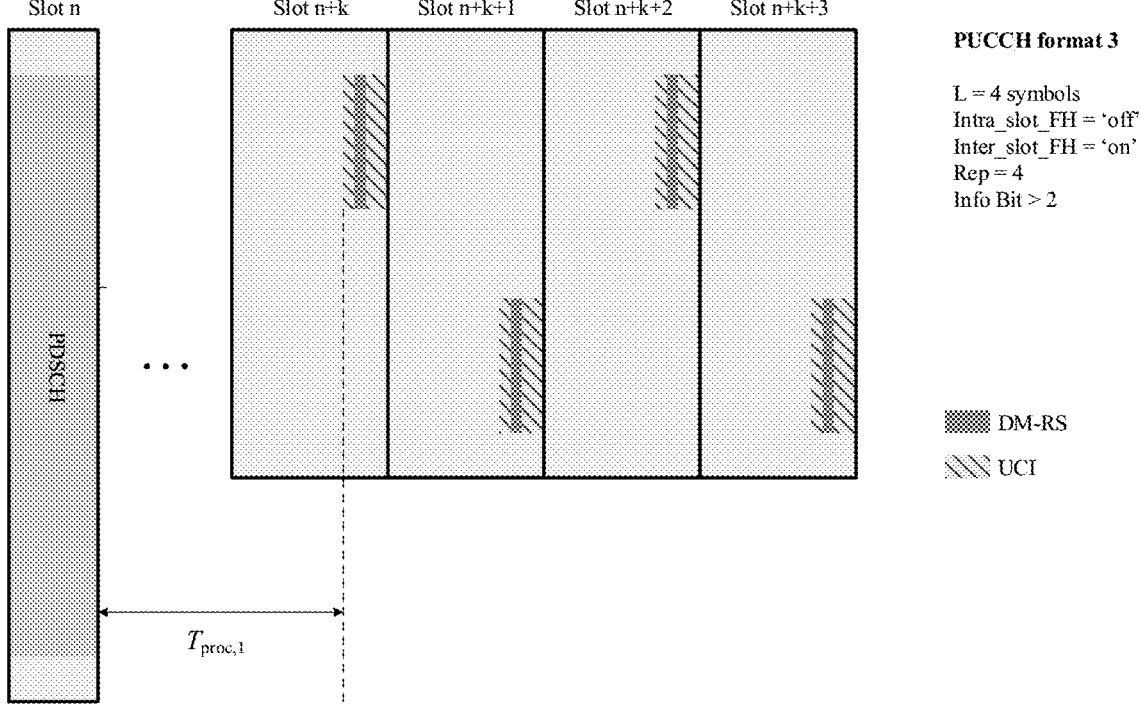
FIG. 12 is a schematic diagram of still another example of PUCCH format 3.

FIG. 12 is a schematic diagram of still another example of PUCCH format 3. In the example of FIG. 12, inter-slot frequency hopping occurs. The example of FIG. 12 is similar to the example of FIG. 11, with a difference that in the example of FIG. 12, PUCCH repetitions of PUCCH format 3 alternately occupy different frequency domain resources in different slots.

It should be further noted that a PUCCH in which time domain repetitions occurs may also perform intra-slot frequency hopping. In each slot, reference may be made to FIG. 10 for a mode of the frequency hopping, which shall not be described herein any further.

In the embodiments of this disclosure, PUCCH format 4 is similar to PUCCH format 3, with a difference that a frequency domain bandwidth occupied by PUCCH format 4 is fixed at 1 PRB. In addition, in order to facilitate resource sharing between UEs, PUCCH format 4 is able to perform block-wise spreading, or in other words, frequency domain expansion. Reference may be made to related technologies for specific methods, which shall not be described herein any further.

Various embodiments of this disclosure shall be described below with reference to the accompanying drawings. These embodiments are illustrative only and are not intended to limit this disclosure.

Embodiments of a First Aspect

The embodiments of this disclosure provide a method for transmitting uplink control information, which shall be described from a terminal equipment side. FIG. 13 is a schematic diagram of the method for transmitting uplink control information of the embodiment of this disclosure. Referring to FIG. 13, the method includes:

1301: a terminal equipment transmits control information, the uplink control information (PUCCH) being related to at least two TRPs.

According to the above method of the embodiments of this disclosure, the uplink control information is transmitted in the manner of spatial diversity. That is, at the terminal side, the same data may reach a network side via different spatial domain paths or via different TRPs (transmission and reception points). Hence, in a case where blockage occurs in some paths, other paths may still continue to operate, thereby ensuring high reliability of the uplink control information. And furthermore, as the method may make use of spatial diversity gains, the number of retransmissions of the uplink control information may be avoided or reduced, thereby lowering transmission latency of uplink data.

In the embodiments of this disclosure, as described above, formats of the resources corresponding to the PUCCH are at least one of the following:

PUCCH format 0;

PUCCH format 1;

PUCCH format 2;

PUCCH format 3; and

PUCCH format 4.

In some embodiments, the uplink control information being related to at least two TRPs refers to that the uplink control information is cyclically mapped (related) with the TRPs in units of N1 symbols. For example, former N1 symbols of the uplink control information are related to a first TRP of the at least two TRPs, and next N1 symbols of the uplink control information are related to a second TRP of the at least two TRPs. And for remaining symbols of the uplink control information, a TRP association method identical to the above is also applied (or identical TRP mapping pattern is applied), that is, they are still related (mapped) respectively to the first TRP and the second TRP in units of N1 symbols.

According to the above embodiment, PUCCHs are transmitted to different TRPs at a symbol level, which increases reliability. In addition, when some TRPs are blocked, communication with the network device may be quickly performed at subsequent symbols via other paths, which is low in latency.

In the above embodiment, N1 may be of 1 or 2. And in some embodiments, each TRP is mapped at least once at each slot of the PUCCH.

In some embodiments, the uplink control information being related to at least two TRPs refers to that the uplink control information is cyclically mapped (related) with the TRPs in units of time domain parts in a slot associated with the uplink control information. For example, in the slot associated with the uplink control information, a first time domain part of the uplink control information is related to a first TRP of the at least two TRPs, and remaining time domain part of the uplink control information is related at to a second TRP of the at least two TRPs.

According to the above embodiment, PUCCHs may be transmitted to different TRPs respectively within a slot, which increases reliability. In addition, when some TRPs are blocked, communication with the network device may be quickly performed via other paths, which is low in latency. In addition, in this method, PUCCH time domain resources in a slot may be mapped to different TRPs, which is favorable for hardware implementation. This is because the hardware usually processes the uplink control information in units of slots. This method may match a processing time at a hardware slot level, thereby lowering hardware cost.

In the above embodiments, in some embodiments, each TRP is mapped at least once in each slot of the PUCCH.

In the above embodiment, the number of symbols of each time domain part may be a function of a total number of the above at least one TRP. Therefore, PUCCH time domain resources in a slot may be mapped to different TRPs respectively, which is conducive to hardware implementation. This is because the hardware usually processes the uplink control information in units of slots. This method may match a processing time at a hardware slot level, thereby lowering hardware cost.

In some embodiments, the uplink control information being related to at least two TRPs refers to that the uplink control information is cyclically mapped (related) with the TRPs in units of N2 slots. For example, former N2 slots of the uplink control information is related to a first TRP of the at least two TRPs, and next N2 slots of the uplink control information is related to a second TRP of the at least two TRPs. And for remaining symbols of the uplink control information, a TRP association method identical to the above is also applied (or identical TRP mapping pattern is applied), that is, they are still related (mapped) respectively to the first TRP and the second TRP in units of N2 symbols.

According to the above embodiment, the PUSCH switches between multiple TRPs in units of slots, which may lower a total number of switching of the TRPs, which is applicable to a low-capability terminal equipment and is conducive to lowering production costs of the terminal equipment. Here, the low-capability terminal equipment refers to, for example, a terminal equipment which is limited with respect to the number of switching of TRPs within a unit time. Or, in a scenario of high reliability requirements and relatively loose latency requirements, the terminal equipment may reduce the number of switching of TRPs by using this method, thereby achieving an effect of power saving.

In the above embodiment, the number of N2 may be 1,2,4 or 8. In general, in multiple TRPs, TRPs of best channel quality are transmitted preferentially in the time domain. When N2 is relatively large and there exists no blockage, the terminal equipment is able to transmit data via an optimal TRP faster, thereby improving the system performance. When N2 is relatively small, in a case where the optimal TRP is blocked, as different TRPs being mapped alternately in a shorter time unit, the terminal equipment is able to transmit data via another TRP faster, thereby reducing latency.

FIG. 14 is a schematic diagram of an example of a mapping relation between PUCCH format 0 and TRPs. The scenario in FIG. 14 corresponds to FIG. 1, in which, a PUCCH being related to two TRPs is taken as an example.

The mapping mode in FIG. 14 may be referred to as inter-symbol TRP mapping, that is, the PUCCH is cyclically mapped (related) with the TRPs in units of N1 (N1=1) symbols. As shown in FIG. 14, a first symbol of the PUCCH is related to TRP #1, and a second symbol of the PUCCH is related to TRP #2.

Figures 15, 16:
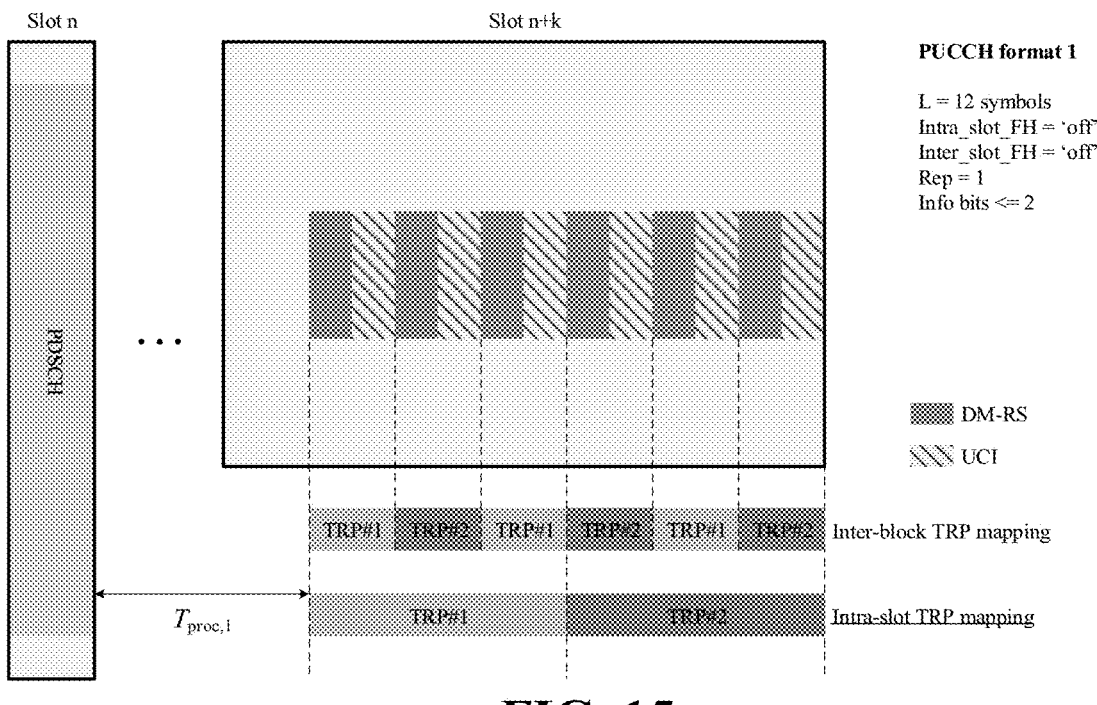
FIG. 15 is a schematic diagram of an example of a mapping relation between PUCCH format 1 and TRPs.
FIG. 16 is a schematic diagram of another example of the mapping relation between PUCCH format 1 and TRPs.

FIG. 15 is a schematic diagram of an example of a mapping relation between PUCCH format 1 and TRPs. The scenario in FIG. 15 corresponds to FIG. 3, in which, a PUCCH being related to two TRPs is taken as an example.

As shown in FIG. 15, in the inter-block TRP mapping, two consecutive symbols (a DM-RS and UCI) are regarded as a block and mapped to a TRP; and if a length of the PUCCH is of an odd number, a last block contains only the DM-RS. In this example, the PUCCH is cyclically mapped (related) with the TRPs in units of N1 (N1=2) symbols.

As shown in FIG. 15, in the intra-slot TRP mapping, the PUCCH in a slot is divided into two time domain parts, wherein a first time domain part has a length of $$\left\lceil \frac{N_{symb}^{PUCCH}}{2} \right\rceil$$

and is mapped to TRP #1, and time domain parts of the remaining part are mapped to TRP #2; where, $$N_{symb}^{PUCCH}$$

is the number of symbols occupied by a PUCCH in a slot. In this example, the PUCCH is respectively related to TRP #1 and TRP #2 in unit of two time domain parts in slot n+k (former six symbols and latter six symbols of slot n+k).

In the above embodiment, a length of the orthogonal cover code sequence of the uplink control information may be determined according to a time domain resource related to the uplink control information and/or according to a time domain length of a repetition or a transmission occasion related to the uplink control information, wherein the time domain resources or the repetition or the transmission occasion is related to one of the at least two TRPs. Therefore, as channels corresponding to the TRPs are different, this design makes the time-frequency resources of the uplink control information corresponding to different TRPs correspond to cover codes of corresponding lengths. In this way, a group of UEs with similar channel characteristics (corresponding to identical TRPs) share a group of orthogonal cover codes, thereby ensuring orthogonality of the cover codes, avoiding interference between terminal equipments, and improving system performance.

For example, as to the inter-block TRP mapping shown in FIG. 15, the length of the orthogonal cover code sequence of the PUCCH may be determined according to the number of DM-RSs or UCIs in the block. As one block includes one DM-RS and one UCI, the length of the orthogonal cover code sequence is 1.

For another example, as to the inter-block TRP mapping shown in FIG. 15, the length of the orthogonal cover code sequence of the PUCCH may be determined according to the number of DM-RSs or UCIs corresponding to identical TRPs in the slot. As the number of DM-RSs or UCIs corresponding to TRP #1 in slot n+k is 3, the length of the orthogonal cover code sequence is 3.

For a further example, as to the intra-slot TRP mapping shown in FIG. 15, the length of the orthogonal cover code sequence of the PUCCH may also be determined according to the number of DM-RSs or UCIs corresponding to identical TRPs in the slot. As the number of DM-RSs or UCIs corresponding to TRP #1 in slot n+k is 3, the length of the orthogonal cover code sequence is also 3.

It should be noted that reference may be made to relevant technologies for the mapping relation between the length of the orthogonal cover code sequence and the corresponding orthogonal cover code sequence, i.e. a mapping mode of the relevant technologies is reused, and this application is not limited thereto.

In addition, FIG. 15 shows only one slot, i.e. slot n+k, and when the time domain resources occupied by the PUCCH exceed one slot, each slot of the PUCCH performs TRP mapping and orthogonal cover code mapping by using the above method.

FIG. 16 is a schematic diagram of another example of the mapping relation between PUCCH format 1 and TRPs. The scenario in FIG. 16 corresponds to FIG. 5, in which, a PUCCH being related to two TRPs is taken as an example.

As shown in FIG. 16, in inter-slot TRP mapping, PUCCHs in each slot are alternately mapped to two TRPs (TRP #1 and TRP #2) in a time domain order in units of one slot, and in inter-2-slot TRP mapping, the PUCCHs in each slot are alternately mapped to two TRPs (TRP #1 and TRP #2) in a time domain order in units of two slots.

Figure 17:
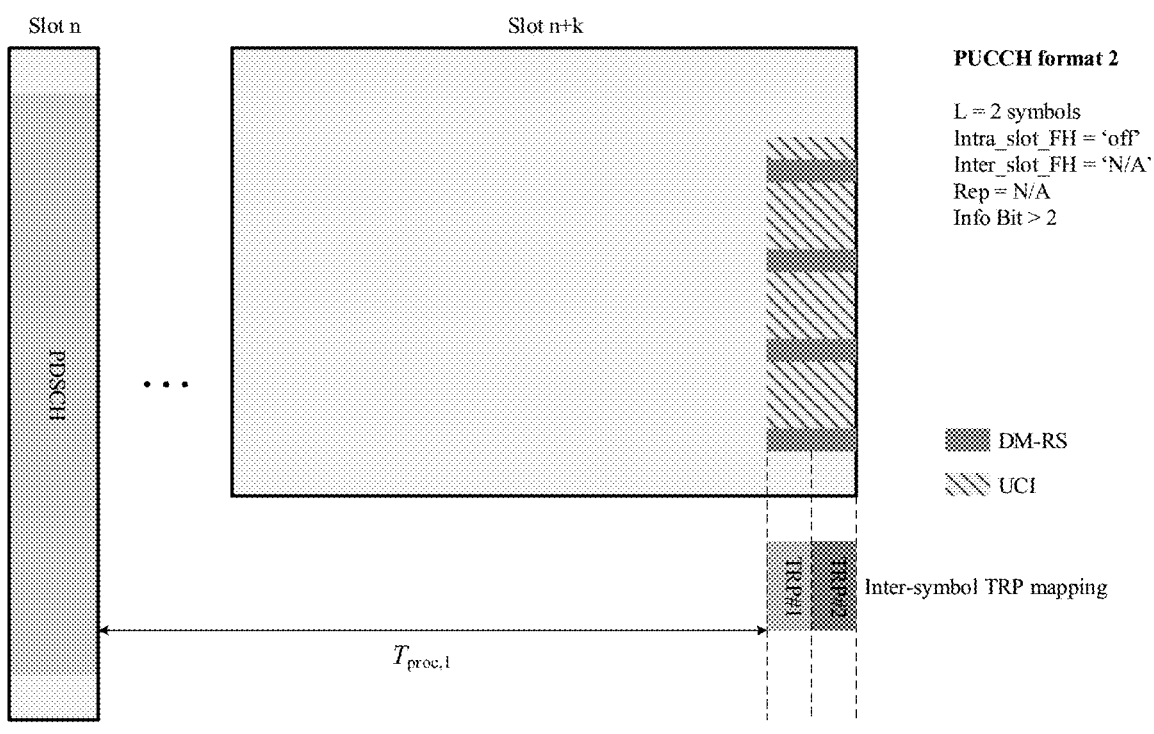
FIG. 17 is a schematic diagram of an example of a mapping relation between PUCCH format 2 and TRPs.

FIG. 17 is a schematic diagram of an example of a mapping relation between PUCCH format 2 and TRPs. The scenario in FIG. 17 corresponds to FIG. 7, in which, a PUCCH being related to two TRPs is taken as an example.

The mapping mode in FIG. 17 may be referred to as inter-symbol TRP mapping. As shown in FIG. 17, a first symbol of the PUCCH is related to TRP #1, and a second symbol of the PUCCH is related to TRP #2.

Figure 18:
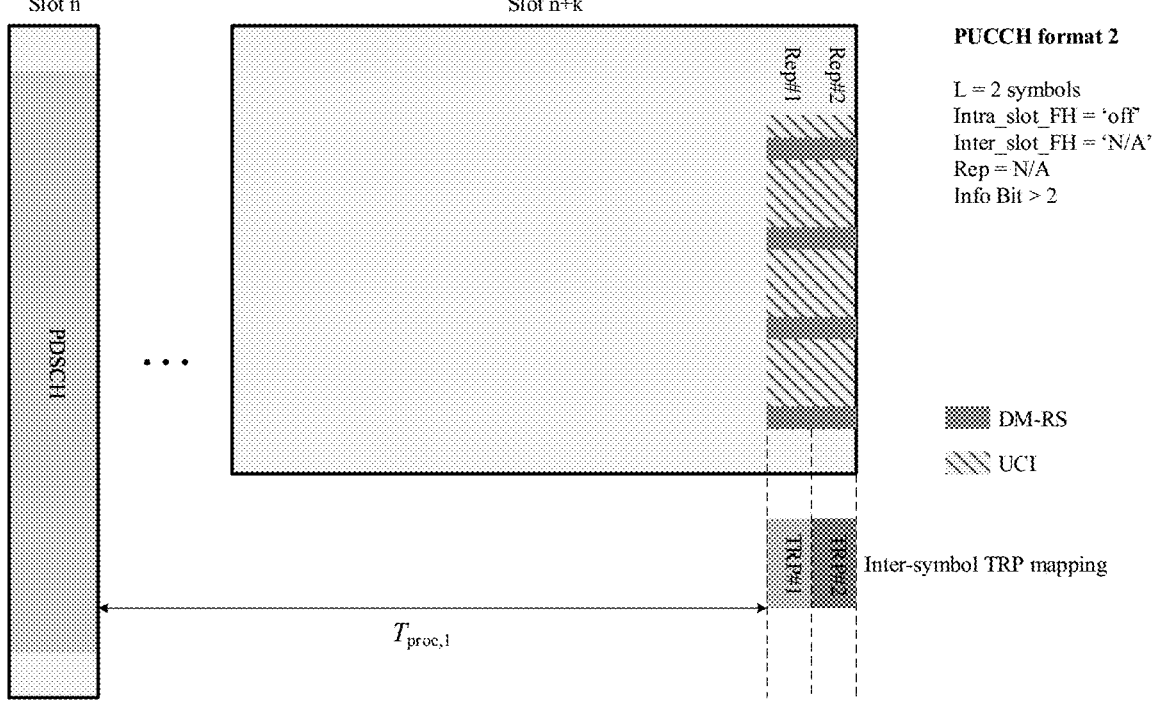
FIG. 18 is a schematic diagram of another example of the mapping relation between PUCCH format 2 and TRPs.

FIG. 18 is a schematic diagram of another example of the mapping relation between PUCCH format 2 and TRPs. The example of FIG. 18 is a variant of the example of FIG. 17, and what is different from the example of FIG. 17 is that UCI bits carried by the first symbol of the PUCCH are identical to those carried by the second symbol of the PUCCH, or, in other words, the first symbol corresponds to PUCCH repetition #1, and the second symbol corresponds to PUCCH repetition #2. In the example of FIG. 18, similar in FIG. 17, the first symbol of the PUCCH is related to TRP #1, and the second symbol of the PUCCH is related to TRP #2. It should be noted that the format corresponding to the PUCCH is only illustrated as PUCCH format 2. The PUCCH of this example may also be of other PUCCH formats than PUCCH formats 0-4.

Figure 19:
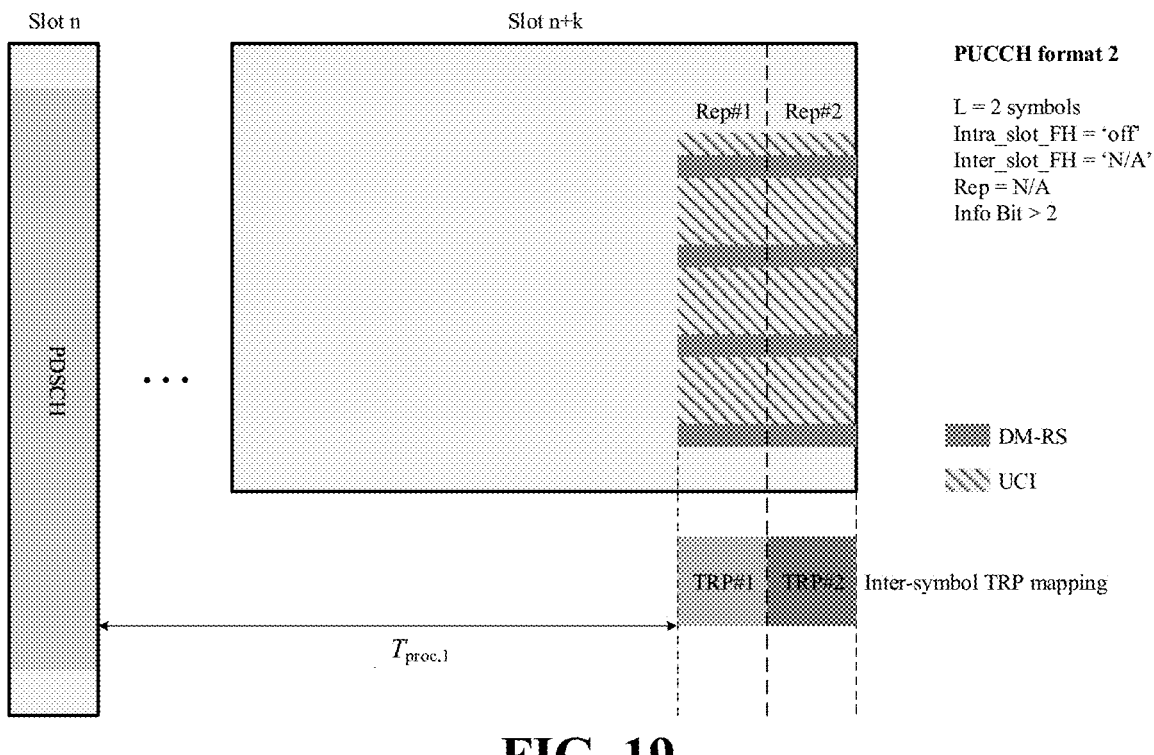
FIG. 19 is a schematic diagram of a further example of the mapping relation between PUCCH format 2 and TRPs.

FIG. 19 is a schematic diagram of a further example of the mapping relation between PUCCH format 2 and TRPs. The example of FIG. 19 is a variant of the example of FIG. 18, and what is different from the example of FIG. 18 is that each PUCCH repetition consists of two symbols, and UCI bits carried by a former part (a first and second symbols) of the PUCCH are identical to those carried by a latter part (a third and fourth symbols) of the PUCCH. In the example of FIG. 19, the first and second symbols of the PUCCH are related to TRP #1, and the third and fourth symbols of the PUCCH are related to TRP #2. Similar to the example above, the format corresponding to the PUCCH is only illustrated as PUCCH format 2. The PUCCH of this example may also be of other PUCCH formats than PUCCH formats 0-4.

Figure 20:
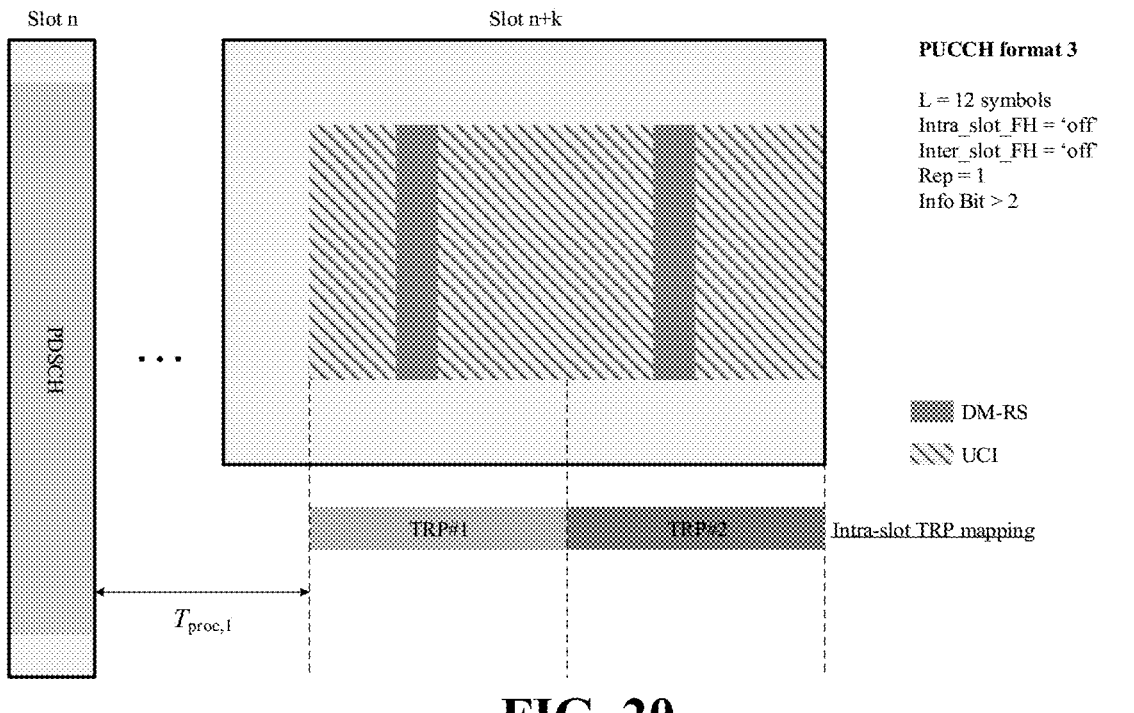
FIG. 20 is a schematic diagram of an example of a mapping relation between PUCCH format 3 and TRPs.

FIG. 20 is a schematic diagram of an example of a mapping relation between PUCCH format 3 and TRPs. The scenario in FIG. 20 corresponds to FIG. 9, in which, a PUCCH being related to two TRPs is taken as an example.

The mapping mode in FIG. 20 may be referred to as intra-TRP mapping. As shown in FIG. 20, the PUCCH in a slot is divided into two time domain parts, wherein a first time domain part has a length of $$\left\lfloor \frac{N_{symb}^{PUCCH}}{2} \right\rfloor$$

and is mapped to TRP #1, and the remaining time domain parts is mapped to TRP #2; where $$N_{symb}^{PUCCH}$$

is the number of symbols occupied by a PUCCH in a slot $$\left( N_{symb}^{PUCCH} = 12 \right.$$

in this example).

Figure 21:
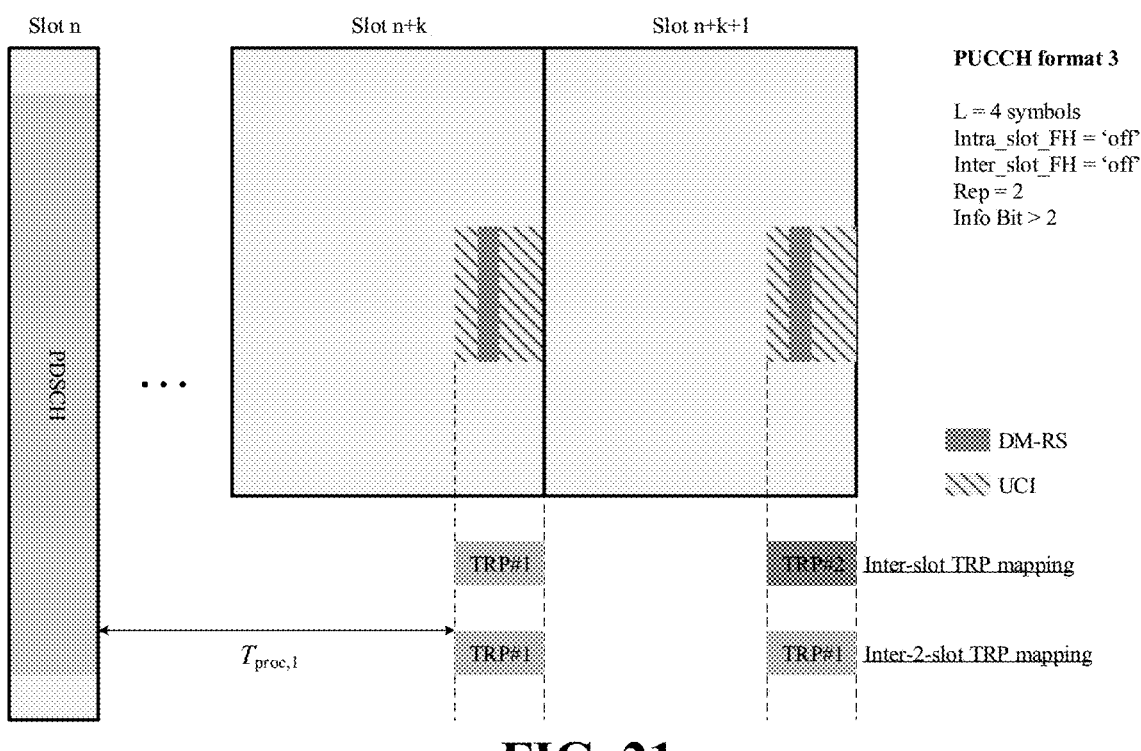
FIG. 21 is a schematic diagram of another example of the mapping relation between PUCCH format 3 and TRPs.

FIG. 21 is a schematic diagram of another example of the mapping relation between PUCCH format 3 and TRPs. The scenario in FIG. 21 corresponds to FIG. 11, in which, a PUCCH being related to two TRPs is taken as an example. Different from the scenario in FIG. 11, in the scenario in FIG. 21, only two slots, slot n+k and slot n+k+1, are shown.

As shown in FIG. 21, in the inter-slot TRP mapping, PUCCHs in each slot are alternately mapped to two TRPs (TRP #1 and TRP #2) in a time domain order in units of one slot, and in inter-2-slot TRP mapping, the PUCCHs in each slot are alternately mapped to two TRPs (TRP #1 and TRP #2) in a time domain order in units of two slots.

In the embodiments of this disclosure, in some embodiments, when transmitting the uplink control information, the terminal equipment may perform frequency hopping on the transmission of the uplink control information according to the at least two TRPs. For example, the terminal equipment may perform frequency hopping on the transmission of the uplink control information according to a transmission occasion, repetition or time-frequency resource associated with one of the above at least two TRPs.

According to the above embodiment, in case of blockage, it may be ensured that even if only a part of TRPs may operate normally, the transmission of the uplink control signals may reasonably perform frequency hopping according to the frequency hopping pattern, thereby achieving relatively high frequency diversity gains.

In some embodiments, performing frequency hopping may refer to performing frequency hopping according to a slot where the uplink control information is located (that is performing frequency hopping per slot), or performing frequency hopping within a slot where the uplink control information is located according to the frequency domain part corresponding to the uplink control information (that is performing frequency hopping within a slot).

In some embodiments, the frequency hopping patterns associated with each of the above at least two TRPs may be identical. Therefore, multiple TRPs may use identical frequency hopping indication information, which may save signaling overhead. However, this disclosure is not limited thereto, and the frequency hopping patterns associated with each of the above at least two TRP may also be different.

In the embodiments of this disclosure, the frequency hopping pattern may be at least one of the following:
whether frequency hopping occurs;
frequency hopping mode;
the number (hops) of frequency hopping, i.e. the number of the frequency hopping or hops corresponding to the frequency hopping;
a starting position of frequency hopping, such as a starting frequency domain position of frequency hopping;
a frequency hopping offset, such as a relative frequency domain position of each subsequent hop.

Figure 22:
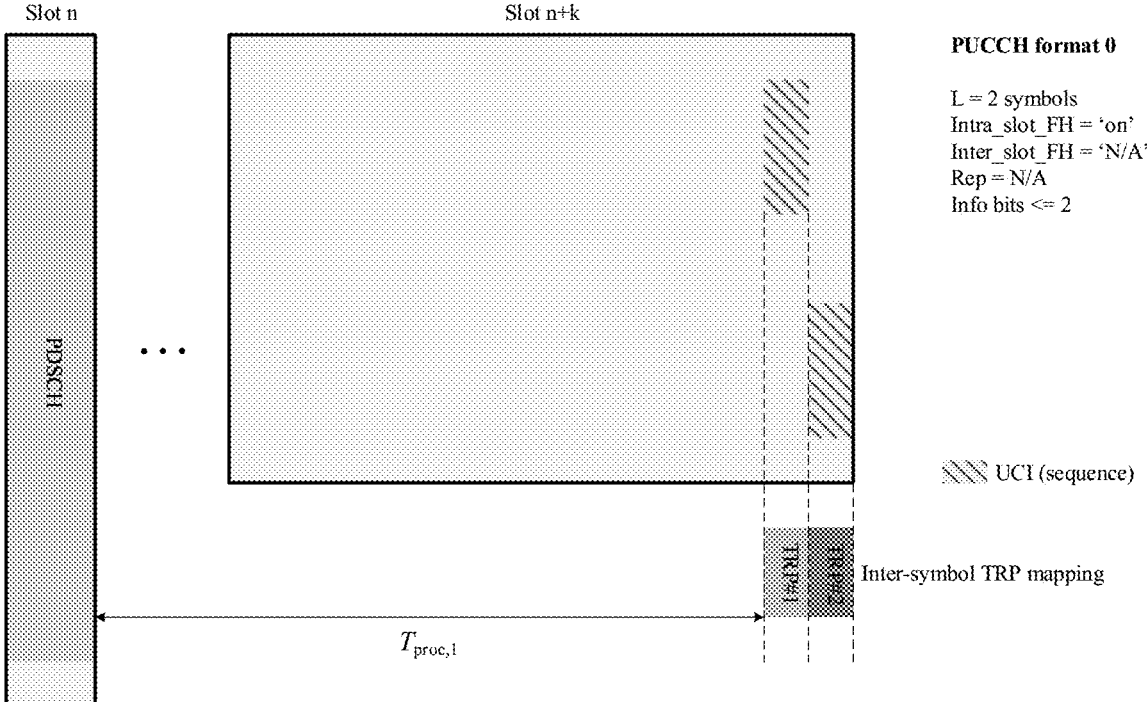
FIG. 22 is a schematic diagram of a frequency hopping pattern of intra-slot frequency hopping corresponding to the inter-symbol TRP mapping shown in FIG. 14.

FIG. 22 is a schematic diagram of a frequency hopping pattern of intra-slot frequency hopping corresponding to the inter-symbol TRP mapping shown in FIG. 14. As shown in FIG. 22, a first symbol of the PUCCH corresponding to TRP #1 and a second symbol of the PUCCH corresponding to TRP #2 occupy different frequency resources.

Figure 23:
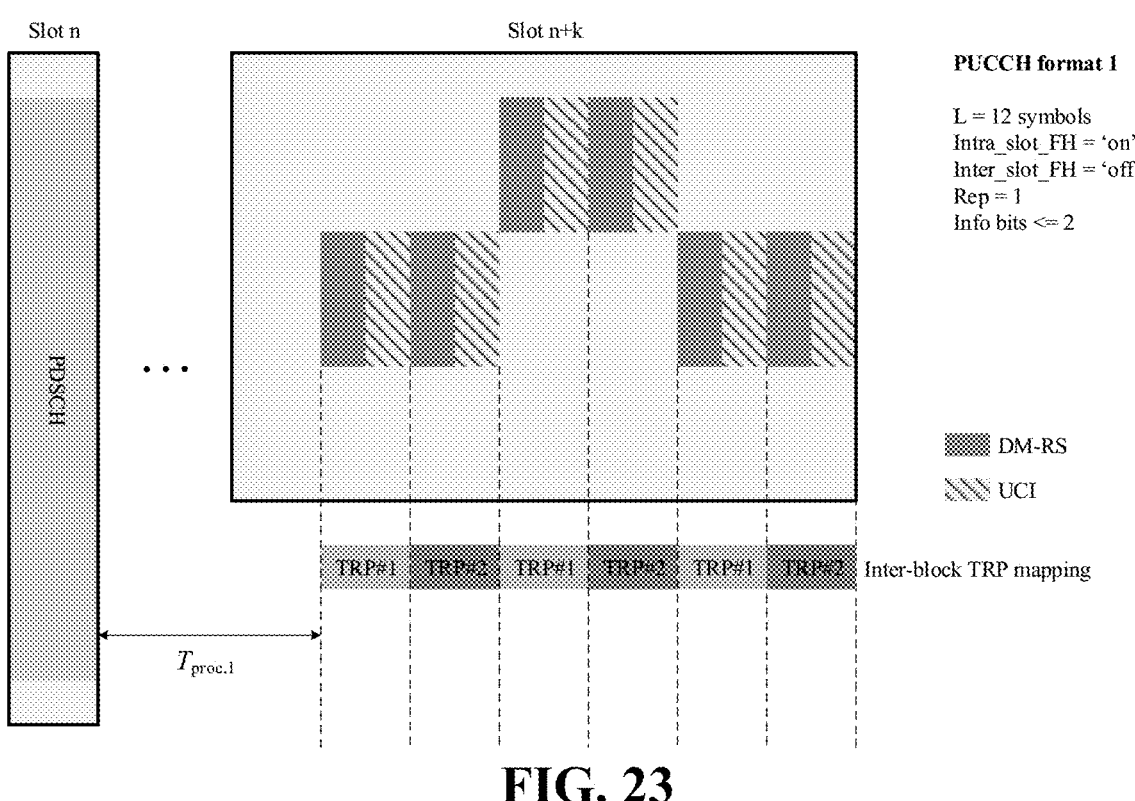
FIG. 23 is a schematic diagram of a frequency hopping pattern of intra-slot frequency hopping corresponding to the inter-block TRP mapping shown in FIG. 15.

FIG. 23 is a schematic diagram of a frequency hopping pattern of intra-slot frequency hopping corresponding to the inter-block TRP mapping shown in FIG. 15. As shown in FIG. 23, frequency hopping is performed on different time domain parts corresponding to identical TRPs in a slot. In the figure, two hops are taken as examples. A first time domain part corresponding to TRP #1 is time domain symbols 2 and 3, corresponding to a first hop, a second time domain part corresponding to TRP #1 is time domain symbols 6 and 7, corresponding to a second hop, and a third time domain part corresponding to TRP #1 is time domain symbols 10 and 11, corresponding to the first hop (cycled to the first one of the two hops). A frequency hopping pattern associated with TRP #2 is identical to that associated with TRP #1. Specifically, time-frequency resources corresponding to TRP #1 perform frequency hopping in units of blocks in a frequency hopping mode of intra-slot frequency hopping, with the number of frequency hopping (or a candidate frequency domain position of frequency hopping) being 2; likewise, time-frequency resources corresponding to TRP #2 perform frequency hopping in units of blocks in the frequency hopping mode of intra-slot frequency hopping, with the number of frequency hopping (or a candidate frequency domain position of frequency hopping) being also 2. In addition, a frequency domain position of a starting block corresponding to TRP #1 is identical to a frequency domain position of a starting block corresponding to TRP #2. And furthermore, a frequency offset between the two frequency hopping candidate positions corresponding to TRP #1 is identical to a frequency offset between the two frequency hopping candidate positions corresponding to TRP #2.

In the example of FIG. 23, that the frequency hopping patterns corresponding to TRP #1 and TRP #2 are identical is taken as an example; however, as described above, the frequency hopping patterns to which they correspond may also be different. In addition, when the time domain resources occupied by the PUCCH is more than one slot, each slot of the PUCCH uses the above method to perform mapping of the frequency hopping patterns.

Figure 24:
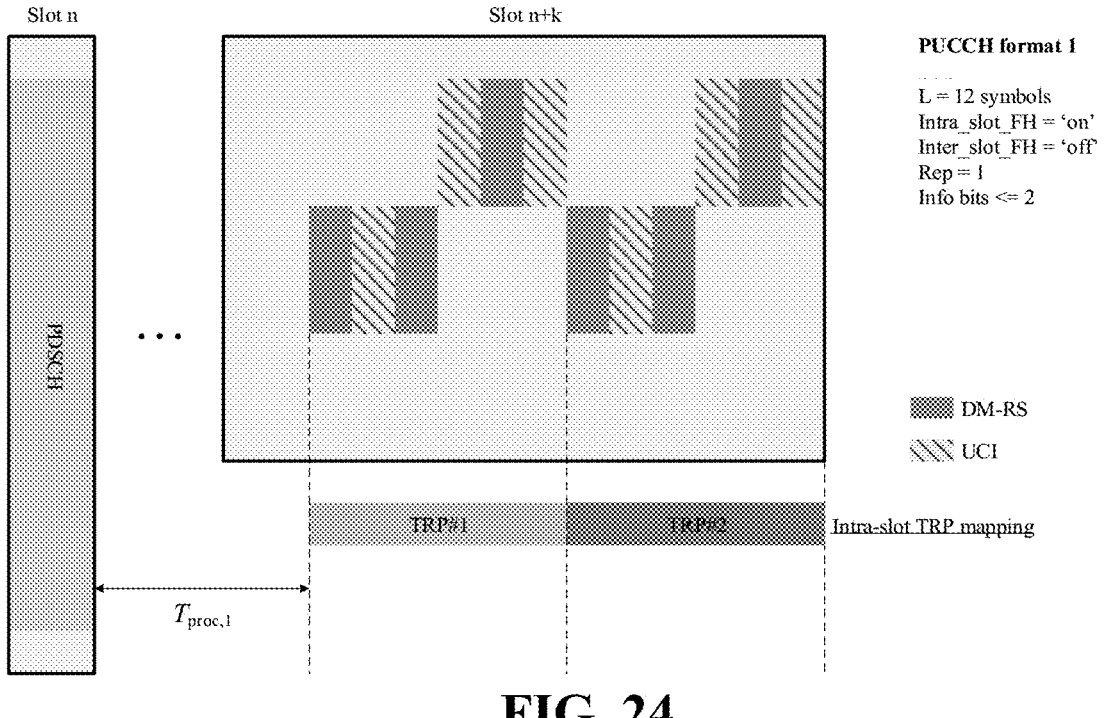
FIG. 24 is a schematic diagram of a frequency hopping pattern of intra-slot frequency hopping corresponding to the intra-slot TRP mapping shown in FIG. 15.

FIG. 24 is a schematic diagram of a frequency hopping pattern of intra-slot frequency hopping corresponding to the intra-slot TRP mapping shown in FIG. 15. As shown in FIG. 24, frequency hopping is performed on different time domain parts corresponding to identical TRPs in a slot. Taking a transmission occasion (time domain symbols 3 to 8, that is, a length is $$N_{symb}^{PUCCH} = 6)$$

corresponding to TRP #1 as an example, a length of a first part is $$\left\lceil \frac{N_{symb}^{PUCCH}}{2} \right\rceil,$$

which is mapped to the first hop, and the remaining parts are mapped to the second hop.

In the example of FIG. 24, a length of an orthogonal cover code sequence may be determined according to a time domain length of each hop. For example, for the first hop associated with TRP #1, a length of the hop is of 3 symbols, including two DM-RS symbols, hence, a length of a corresponding cover code is 2, and including a UCI symbol, hence, a length of a corresponding cover code is 1. For the second hop associated with TRP #1, a length of the hop is of 3 symbols, including one DM-RS symbol, hence, a length of a corresponding cover code is 1, and including two UCI symbols, hence, a length of a corresponding cover code is 2. TRP #2 also has a similar relation, which shall not be described herein any further. Reference may be made to related technologies for the mapping relation between the length of the orthogonal cover code sequence and the orthogonal cover code sequence, which shall not be described herein any further.

In the example of FIG. 24, that the frequency hopping patterns corresponding to TRP #1 and TRP #2 are identical is taken as an example. Specifically, time-frequency resources corresponding to TRP #1 perform frequency hopping in units of time domain parts in the frequency hopping mode of intra-slot frequency hopping, with the number of frequency hopping (or a candidate frequency domain position of frequency hopping) being 2; likewise, time-frequency resources corresponding to TRP #2 perform frequency hopping in units of time domain parts in the frequency hopping mode of intra-slot frequency hopping, with the number of frequency hopping (or a candidate frequency domain position of frequency hopping) being also 2. In addition, a frequency domain position of a starting block corresponding to TRP #1 is identical to a frequency domain position of a starting block corresponding to TRP #2. And furthermore, a frequency offset between the two frequency hopping candidate positions corresponding to TRP #1 is identical to a frequency offset between the two frequency hopping candidate positions corresponding to TRP #2. However, as described above, the frequency hopping patterns to which they correspond may also be different. In addition, when the time domain resources occupied by the PUCCH is more than one slot, each slot of the PUCCH uses the above method to perform mapping of the frequency hopping patterns.

Figure 25:
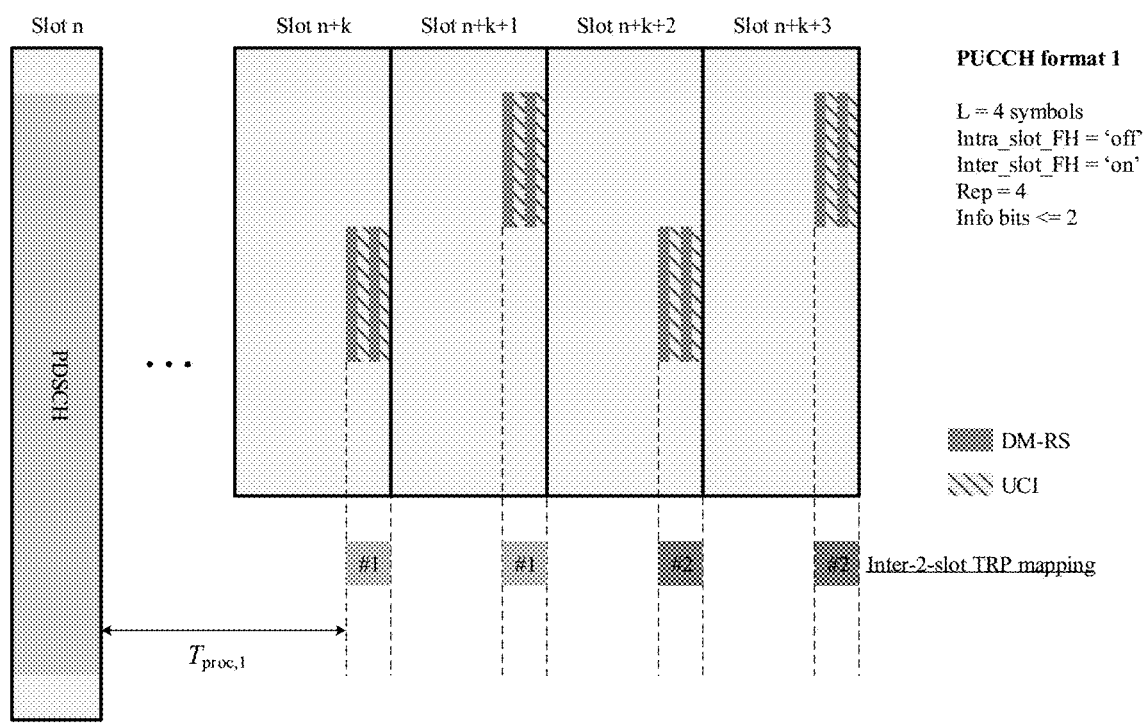
FIG. 25 is a schematic diagram of a frequency hopping pattern of inter-slot frequency hopping corresponding to the inter-2-slot TRP mapping shown in FIG. 16.

FIG. 25 is a schematic diagram of a frequency hopping pattern of inter-slot frequency hopping corresponding to the inter-2-slot TRP mapping shown in FIG. 16. As shown in FIG. 25, frequency hopping will sequentially occur on different repetitions (transmission occasions) corresponding to identical TRPs. In FIG. 25, two hops are taken as examples. A first repetition (transmission occasion) corresponding to TRP #1 is in slot n+k, corresponding to the first hop; and a second repetition (transmission occasion) corresponding to TRP #1 is in slot n+k+1, corresponding to the second hop. The frequency hopping pattern associated with TRP #2 is identical to that associated with TRP #1. Specifically, the time-frequency resources corresponding to TRP #1 performs frequency hopping in units of repetitions in the frequency hopping mode of inter-slot frequency hopping, with the number of frequency hopping (or a candidate frequency domain position of frequency hopping) being 2; likewise, time-frequency resources corresponding to TRP #2 perform frequency hopping in units of repetitions in the frequency hopping mode of inter-slot frequency hopping, with the number of frequency hopping (or a candidate frequency domain position of frequency hopping) being also 2. In addition, a frequency domain position of a starting repetition corresponding to TRP #1 is identical to a frequency domain position of a starting repetition corresponding to TRP #2. And furthermore, a frequency offset between the two frequency hopping candidate positions corresponding to TRP #1 is identical to a frequency offset between the two frequency hopping candidate positions corresponding to TRP #2.

In the example of FIG. 25, that the frequency hopping patterns corresponding to TRP #1 and TRP #2 are identical is taken as an example; however, as described above, the frequency hopping patterns to which they correspond may also be different.

Figure 26:
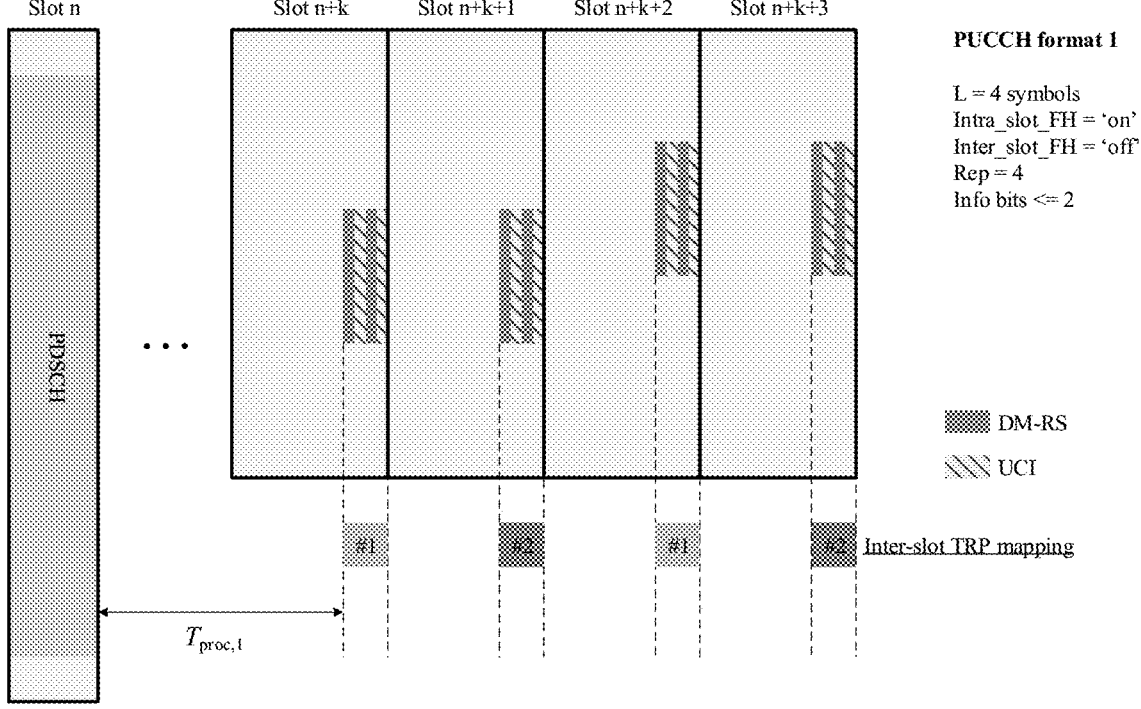
FIG. 26 is a schematic diagram of a frequency hopping pattern of inter-slot frequency hopping corresponding to the inter-slot TRP mapping shown in FIG. 16.

FIG. 26 is a schematic diagram of a frequency hopping pattern of inter-slot frequency hopping corresponding to the inter-slot TRP mapping shown in FIG. 16. As shown in FIG.

26, frequency hopping will sequentially occur on different repetitions (transmission occasions) corresponding to identical TRPs. In FIG. 26, two hops are taken as examples. A first repetition (transmission occasion) corresponding to TRP #1 is in slot n+k, corresponding to the first hop; and a second repetition (transmission occasion) corresponding to TRP #1 is in slot n+k+2, corresponding to the second hop. The frequency hopping pattern associated with TRP #2 is identical to that associated with TRP #1. Specifically, the time-frequency resources corresponding to TRP #1 perform frequency hopping in units of repetitions in the frequency hopping mode of inter-slot frequency hopping, with the number of frequency hopping (or a candidate frequency domain position of frequency hopping) being 2; likewise, time-frequency resources corresponding to TRP #2 perform frequency hopping in units of repetitions in the frequency hopping mode of inter-slot frequency hopping, with the number of frequency hopping (or a candidate frequency domain position of frequency hopping) being also 2. In addition, a frequency domain position of a starting repetition corresponding to TRP #1 is identical to a frequency domain position of a starting repetition corresponding to TRP #2. And furthermore, a frequency offset between the two frequency hopping candidate positions corresponding to TRP #1 is identical to a frequency offset between the two frequency hopping candidate positions corresponding to TRP #2.

In the example of FIG. 26, that the frequency hopping patterns corresponding to TRP #1 and TRP #2 are identical is taken as an example; however, as described above, the frequency hopping patterns to which they correspond may also be different.

Figure 27:
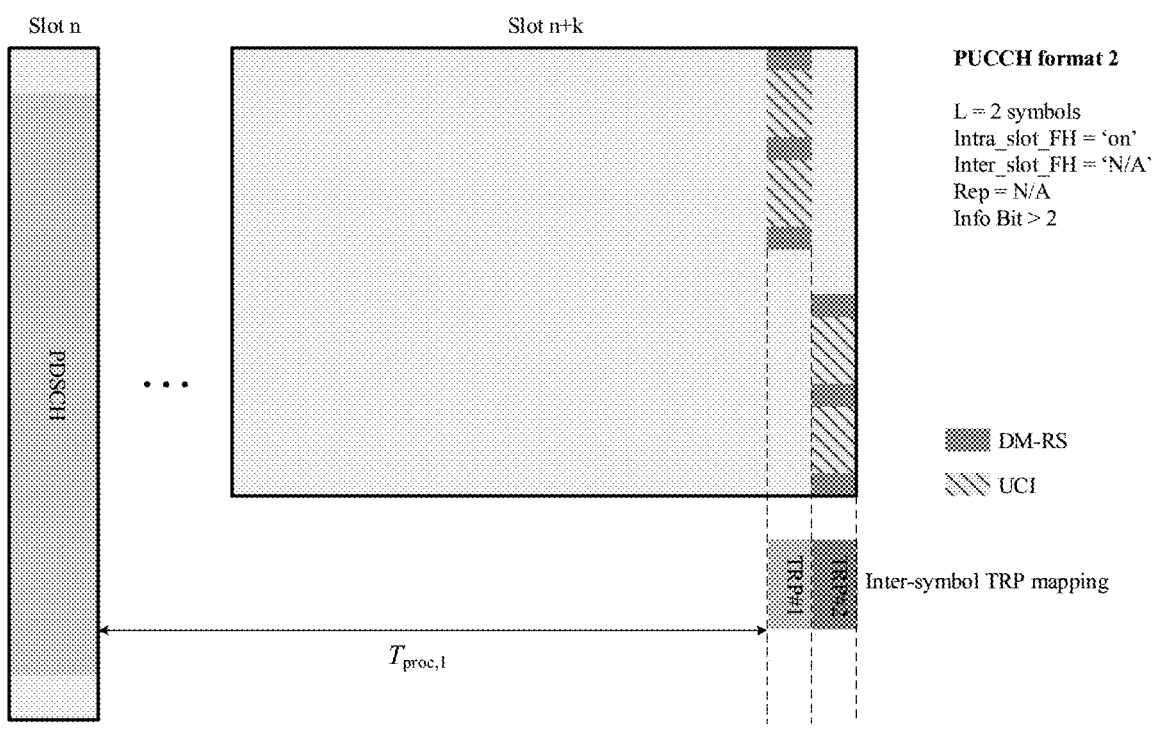
FIG. 27 is a schematic diagram of a frequency hopping pattern of intra-slot frequency hopping corresponding to the inter-symbol TRP mapping shown in FIG. 17.

FIG. 27 is a schematic diagram of a frequency hopping pattern of intra-slot frequency hopping corresponding to the inter-symbol TRP mapping shown in FIG. 17. As shown in FIG. 27, a first symbol of the PUCCH corresponding to TRP #1 and a second symbol of the PUCCH corresponding to TRP #2 occupy different frequency domain resources.

Figure 28:
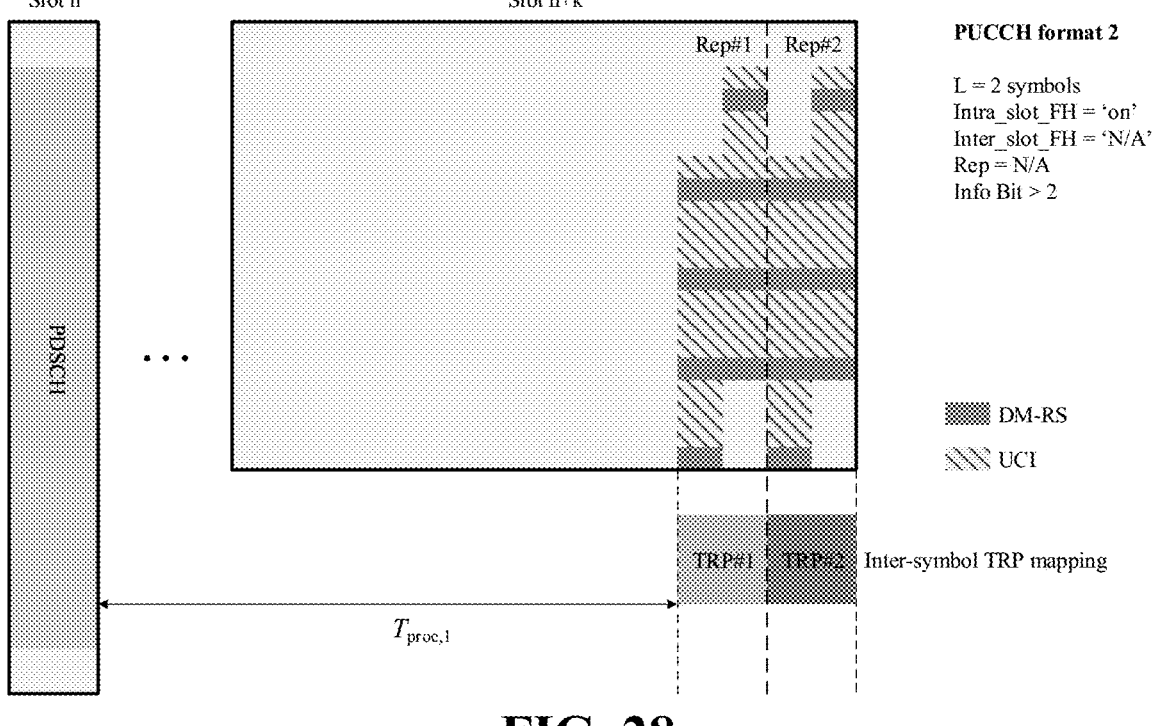
FIG. 28 is a schematic diagram of a frequency hopping pattern of intra-slot frequency hopping corresponding to the inter-symbol TRP mapping shown in FIG. 19.

FIG. 28 is a schematic diagram of a frequency hopping pattern of intra-slot frequency hopping corresponding to the inter-symbol TRP mapping shown in FIG. 19. As shown in FIG. 28, frequency hopping occurs between different symbols in each PUCCH repetition. For example, taking two hops as an example, a first symbol of PUCCH repetition #1 corresponding to TRP #1 corresponds to the first hop, and a second symbol thereof corresponds to the second hop; a first symbol of PUCCH repetition #2 corresponding to TRP #2 corresponds to the first hop, and a second symbol thereof corresponds to the second hop; wherein the frequency hopping pattern associated with TRP #2 is identical to that associated with TRP #1. Specifically, the time-frequency resources corresponding to TRP #1 perform frequency hopping in units of repetitions in the frequency hopping mode of intra-slot frequency hopping, with the number of frequency hopping (or a candidate frequency domain position of frequency hopping) being 2; likewise, time-frequency resources corresponding to TRP #2 perform frequency hopping in units of repetitions in the frequency hopping mode of intra-slot frequency hopping, with the number of frequency hopping (or a candidate frequency domain position of frequency hopping) being also 2. In addition, a frequency domain position of a starting hop of repetition #1 corresponding to TRP #1 is identical to a frequency domain position of a starting hop of repetition #2 corresponding to TRP #2. And furthermore, a frequency offset between the two frequency hopping candidate positions corresponding to TRP #1 is identical to a frequency offset between the two frequency hopping candidate positions corresponding to TRP #2.

In the example of FIG. 28, that the frequency hopping patterns corresponding to TRP #1 and TRP #2 are identical is taken as an example; however, as described above, the frequency hopping patterns to which they correspond may also be different.

In the embodiments of this disclosure, the frequency hopping pattern corresponding to intra-slot TRP mapping in FIG. 20 may refer to FIG. 24, the frequency hopping pattern corresponding to inter-slot TRP mapping in FIG. 21 may refer to FIG. 26, and the frequency hopping pattern corresponding to inter-2-slot TRP mapping in FIG. 21 may refer to FIG. 25, which shall not be described herein any further.

The mapping between the PUCCH and the TRPs and the frequency hopping patterns corresponding to the mapping are illustrated above by taking PUCCH format 0, PUCCH format 1, PUCCH format 2 and PUCCH format 3 as examples, and reference may be made to PUCCH format 3 for the TRP mapping of PUCCH format 4 and the frequency hopping patterns corresponding to the mapping, which shall not be described herein any further.

In the embodiments of this disclosure, in some embodiments, as shown in FIG. 13, optionally, the method further includes:

1302: The terminal equipment generates the sequence corresponding to the uplink control information according to the at least two TRPs.

According to the above embodiment, because the corresponding TRPs are different, the set of jamming terminal equipments corresponding to each TRP is different. The sequence corresponding to the uplink control information is generated according to the relevant TRP, which is conducive to the randomization of interference between (uplink control information transmissions of) the terminal equipments corresponding to the same TRP, reducing the interference between these terminal equipments, and thus improving the system performance.

In the embodiments of this disclosure, in some embodiments, as shown in FIG. 13, optionally, the method further includes:

1303: the terminal equipment receives indication information transmitted by the network device, the indication information indicating that the uplink control information is related to at least two TRPs.

In some embodiments, the indication information is included in RRC signaling, the parameters provided by the RRC signaling are common for all resources belong to the same PUCCH format (that is, the provided parameters that are common for all PUCCH resources of a format). One of the parameters provided by the RRC signaling is used to indicate that the uplink control information is related to the at least two TRPs.

According to the above embodiment, PUCCHs of identical formats apply identical TRP mapping patterns, which is conducive to saving signaling overhead. In addition, each PUCCH resource may correspond to respective TRP mapping mode, which is conducive to a base station in indicating transmission of the uplink control channels more flexibly and improving the system performance.

In some embodiments, the indication information is included in the RRC signaling, which acts on a PUCCH resource with an ID.

According to the above embodiment, each PUCCH resource with an ID may be configured with corresponding TRP mapping mode separately. This is helpful for the base station to indicate transmission of the uplink control channels more flexibly according to channel state and improving the system performance.

In the above embodiment, the PUCCH format refers to one of the following:

PUCCH format 0;
PUCCH format 1;
PUCCH format 2;
PUCCH format 3; and
PUCCH format 4.

In the embodiments of this disclosure, the TRP is equivalent to at least one of the following concepts:

a transmission configuration indication (TCI) state;
a spatial relation;
a reference signal;
a reference signal group;
an SRS resource group (containing one or more SRS resources);
a spatial domain filter;
a power control parameter; and
a group of time alignment (TA) related parameters.

Reference may be made to relevant technologies for specific meanings of the above concepts, which shall not be described herein any further.

For example, that the at least one transmission occasion of the PUSCH is related to at least two TRPs is equivalent to that at least one transmission occasion of the PUSCH is related to at least two TCI states, that is, the terminal equipment transmits the PUSCH according to parameters corresponding to the above at least two TCI states.

For another example, that the at least one transmission occasion of the PUSCH is related to at least two TRPs is equivalent to that at least one transmission occasion of the PUSCH is related to at least two spatial relations.

For a further example, that the at least one transmission occasion of the PUSCH is related to at least two TRPs is equivalent to that at least one transmission occasion of the PUSCH is related to at least two reference signals. Here, the reference signals may be pathloss reference signals (RSs), or CSI-RSs (channel state information reference signals), SSBs (synchronization signal blocks), SRSs (sounding reference signals), etc.; however, this disclosure is not limited thereto.

For still another example, that the at least one transmission occasion of the PUSCH is related to at least two TRPs is equivalent to that at least one transmission occasion of the PUSCH is related to at least two reference signal groups. The reference signal groups are one or more reference signals (RSs). Here, the reference signals may be pathloss reference signals (RSs), or CSI-RSs (channel state information reference signals), SSBs (synchronization signal blocks), SRSs (sounding reference signals), etc.; however, this disclosure is not limited thereto.

For yet another example, that the at least one transmission occasion of the PUSCH is related to at least two TRPs is equivalent to that at least one transmission occasion of the PUSCH is related to at least two spatial filters.

For yet still another example, that the at least one transmission occasion of the PUSCH is related to at least two TRPs is equivalent to that at least one transmission occasion of the PUSCH is related to at least two power control parameters.

It should be noted that FIG. 13 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 13.

According to the method of the embodiments of this disclosure, the uplink control information is transmitted in a spatial diversity manner, thus ensuring high reliability of the uplink control information. In addition, as this method may utilize spatial diversity gains, the number of retransmissions of the uplink control information may be avoided or reduced, thereby reducing transmission latency of uplink data.

Embodiments of a Second Aspect

The embodiments of this disclosure provide a method for indicating transmission of uplink control information, which shall be described from a network side. This method is processing at a network side corresponding to the method of the embodiments of the first aspect, with contents identical to those in the embodiments of the first aspect being not going to be described herein any further.

FIG. 29 is a schematic diagram of the method for indicating transmission of uplink control information of the embodiment of this disclosure. As shown in FIG. 29, the method includes:

2901: a network device transmits indication information to a terminal equipment, the indication information indicating that uplink control information is related to at least two TRPs.

In some embodiments, the uplink control information being related to at least two TRPs refers to that, former N1 symbols of the uplink control information are related to a first TRP of the at least two TRPs, and next N1 symbols of the uplink control information are related to a second TRP of the at least two TRPs.

In some embodiments, remaining symbols of the uplink control information are related respectively to the first TRP and the second TRP in units of N1 symbols.

In some embodiments, the number of N1 is at least one of the following: 1, 2.

In some embodiments, the uplink control information being related to at least two TRPs refers to that, in a slot associated with the uplink control information, a first time domain part of the uplink control information is related to a first TRP of the at least two TRPs, and remaining time domain part of the uplink control information is related at to a second TRP of the at least two TRPs.

In some embodiments, the uplink control information being related to at least two TRPs refers to that, former N2 slots of the uplink control information is related to a first TRP of the at least two TRPs, and next N2 slots of the uplink control information is related to a second TRP of the at least two TRPs.

In some embodiments, remaining slots of the uplink control information are related respectively to the first TRP and the second TRP in units of N2 slots.

In some embodiments, the number of N2 is at least one of the following: 1, 2, 4, 8.

In some embodiments, the indication information is included in RRC signaling, the parameters indicated by the RRC signaling are common for all resources belong to the same PUCCH format (that is, the indicated parameters that are common for all PUCCH resources of a format).

In some embodiments, the indication information is included in RRC signaling, which acts on a PUCCH resource with an ID.

In the embodiments of this disclosure, the PUCCH format refers to one of the following:

PUCCH format 0;
PUCCH format 1;
PUCCH format 2;
PUCCH format 3; and
PUCCH format 4.

In some embodiments, the TRP is equivalent to at least one of the following concepts:

a transmission configuration indication state;
a spatial relation;
a reference signal;
a reference signal group;
an SRS resource group;
a spatial domain filter;
a power control parameter; and
a group of time alignment (TA) related parameters.

According to the method of the embodiments of this disclosure, the uplink control information is transmitted in a spatial diversity manner, thus ensuring high reliability of the uplink control information. In addition, as this method may utilize spatial diversity gains, the number of retransmissions of the uplink control information may be avoided or reduced, thereby reducing transmission latency of uplink data.

Embodiments of a Third Aspect

The embodiments of this disclosure provide an apparatus for transmitting uplink control information. The apparatus may be, for example, a terminal equipment, or may be one or more components or assemblies configured in a terminal equipment.

FIG. 30 is a schematic diagram of the apparatus for transmitting uplink control information of an embodiment of this disclosure. As principle of the apparatus for solving problems are similar to the method of the embodiments of the first aspect, reference may be made to the implementation of the method of the embodiments of the first aspect for specific implementations of the apparatus, with identical contents being not going to be repeated herein any further.

As shown in FIG. 30, the apparatus 3000 for transmitting uplink control information of the embodiments of this disclosure includes a transmitting unit 3001 configured to transmit uplink control information, the uplink control information being related to at least two TRPs.

In some embodiments, a format of a resource corresponding to the uplink control information is at least one of the following:

PUCCH format 0;
PUCCH format 1;
PUCCH format 2;
PUCCH format 3;
PUCCH format 4.

In some embodiments, the uplink control information being related to at least two TRPs refers to that, former N1 symbols of the uplink control information are related to a first TRP of the at least two TRPs, and next N1 symbols of the uplink control information are related to a second TRP of the at least two TRPs.

In some embodiments, remaining symbols of the uplink control information are related respectively to the first TRP and the second TRP in units of N1 symbols.

In some embodiments, the number of N1 is at least one of the following: 1, 2.

In some embodiments, the uplink control information being related to at least two TRPs refers to that, in a slot associated with the uplink control information, a
first time domain part of the uplink control information
is related to a first TRP of the at least two TRPs, and
remaining time domain part of the uplink control
information is related at to a second TRP of the at least
two TRPs.

In some embodiments, the uplink control information
being related to at least two TRPs refers to that,
former N2 slots of the uplink control information is
related to a first TRP of the at least two TRPs, and next
N2 slots of the uplink control information is related to
a second TRP of the at least two TRPs.

In some embodiments, remaining slots of the uplink
control information are related respectively to the first TRP
and the second TRP in units of N2 slots.

In some embodiments, the number of N2 is at least one of
the following: 1, 2, 4, 8.

In some embodiments, the transmitting unit 3001 per-
forms frequency hopping on transmission of the uplink
control information according to the at least two TRPs.

In some embodiments, the according to at least two TRPs
refers to, according to a transmission occasion, or a repeti-
tion, or a time-frequency resource associated with one of the
at least two TRPs.

In some embodiments, the performing frequency hopping
refers to performing frequency hopping according to a slot
where the uplink control information is located (that is
performing frequency hopping per slot).

In some embodiments, the performing frequency hopping
refers to performing frequency hopping within a slot where
the uplink control information is located according to a time
domain part corresponding to the uplink control information
(that is performing frequency hopping within a slot).

In some embodiments, frequency hopping patterns asso-
ciated with TRPs in the at least two TRPs are identical.

In some embodiments, as shown in FIG. 30, the apparatus
3000 for transmitting uplink control information further
includes:
a determining unit 3002 configured to determine a length
of an orthogonal cover code of the uplink control informa-
tion according to a time domain length of a time-domain
resource, a repetition or a transmission occasion related to
the uplink control information; wherein the time-domain
resource, the repetition or the transmission occasion is
related to one of the at least two TRPs.

In some embodiments, as shown in FIG. 30, the apparatus
3000 for transmitting uplink control information further
includes:
a generating unit 3003 configured to generate a sequence
corresponding to the uplink control information according to
the at least two TRPs.

In some embodiments, as shown in FIG. 30, the apparatus
3000 for transmitting uplink control information further
includes:
a receiving unit 3004 configured to receive indication
information transmitted by a network device, the indi-
cation information indicating that the uplink control
information is related to at least two TRPs.

In some embodiments, the indication information is con-
tained in RRC signaling, parameters indicated by the RRC
signaling are common for all resources belong to the same
PUCCH format (that is, the indicated parameters that are
common for all PUCCH resources of a format).

In some embodiments, the indication information is con-
tained in RRC signaling, the RRC signaling acting on a
PUCCH resource with an ID.

In some embodiments, the PUCCH format refers to one of
the following:
PUCCH format 0;
PUCCH format 1;
PUCCH format 2;
PUCCH format 3;
PUCCH format 4.

In some embodiments, the TRP is equivalent to at least
one of the following concepts:
a transmission configuration indication state;
a spatial relation;
a reference signal;
a reference signal group;
an SRS resource group;
a spatial domain filter;
a power control parameter; and
a group of time alignment (TA) related parameters.

It should be noted that the components or modules related
to this disclosure are only described above. However, this
disclosure is not limited thereto, and the apparatus 3000 for
transmitting uplink control information may further include
other components or modules, and reference may be made
to related techniques for particulars of these components or
modules.

Furthermore, for the sake of simplicity, connection rela-
tionships between the components or modules or signal
profiles thereof are only illustrated in FIG. 30. However, it
should be understood by those skilled in the art that such
related techniques as bus connection, etc., may be adopted.
And the above components or modules may be implemented
by hardware, such as a processor, a memory, a transmitter,
and a receiver, etc., which are not limited in the embodi-
ments of this disclosure.

According to the embodiments of this disclosure, the
uplink control information is transmitted in a spatial diver-
sity manner, thus ensuring high reliability of the uplink
control information. In addition, as this method may utilize
spatial diversity gains, the number of retransmissions of the
uplink control information may be avoided or reduced,
thereby reducing transmission latency of uplink data.

Embodiments of a Fourth Aspect

The embodiments of this disclosure provide an apparatus
for indicating transmission of uplink control information.
The apparatus may be, for example, a network device, or
may be one or more components or assemblies configured in
a network device.

FIG. 31 is a schematic diagram of the apparatus for
indicating transmission of uplink control information of an
embodiment of this disclosure. As principle of the apparatus
for solving problems are similar to the method of the
embodiments of the second aspect, reference may be made
to the implementation of the method of the embodiments of
the second aspect for specific implementations of the appa-
ratus, with identical contents being not going to be repeated
herein any further.

As shown in FIG. 31, the apparatus 3100 for indicating
transmission of uplink control information of an embodi-
ment of this disclosure includes a transmitting unit 3101
configured to transmit indication information to a terminal
equipment, the indication information indicating that uplink
control information is related to at least two TRPs.

In some embodiments, the uplink control information
being related to at least two TRPs refers to that,
former N1 symbols of the uplink control information are
related to a first TRP of the at least two TRPs, and next N1 symbols of the uplink control information are related to a second TRP of the at least two TRPs.

In some embodiments, remaining symbols of the uplink control information are related respectively to the first TRP and the second TRP in units of N1 symbols.

In some embodiments, the number of N1 is at least one of the following: 1, 2.

In some embodiments, the uplink control information being related to at least two TRPs refers to that, in a slot associated with the uplink control information, a first time domain part of the uplink control information is related to a first TRP of the at least two TRPs, and remaining time domain part of the uplink control information is related at to a second TRP of the at least two TRPs.

In some embodiments, the uplink control information being related to at least two TRPs refers to that, former N2 slots of the uplink control information is related to a first TRP of the at least two TRPs, and next N2 slots of the uplink control information is related to a second TRP of the at least two TRPs.

In some embodiments, remaining slots of the uplink control information are related respectively to the first TRP and the second TRP in units of N2 slots.

In some embodiments, the number of N2 is at least one of the following: 1, 2, 4, 8.

In some embodiments, the indication information is included in RRC signaling, the parameters indicated by the RRC signaling are common for all resources belong to the same PUCCH format (that is, the indicated parameters that are common for all PUCCH resources of a format).

In some embodiments, the indication information is included in RRC signaling, which acts on a PUCCH resource with an ID.

In the embodiments of this disclosure, the PUCCH format refers to one of the following:

PUCCH format 0;
PUCCH format 1;
PUCCH format 2;
PUCCH format 3; and
PUCCH format 4.

In some embodiments, the TRP is equivalent to at least one of the following concepts:

a transmission configuration indication state;
a spatial relation;
a reference signal;
a reference signal group;
an SRS resource group;
a spatial domain filter;
a power control parameter; and
a group of time alignment (TA) related parameters.

According to the embodiments of this disclosure, the uplink control information is transmitted in a spatial diversity manner, thus ensuring high reliability of the uplink control information. In addition, as this method may utilize spatial diversity gains, the number of retransmissions of the uplink control information may be avoided or reduced, thereby reducing transmission latency of uplink data.

Embodiments of a Fifth Aspect

Figure 32:
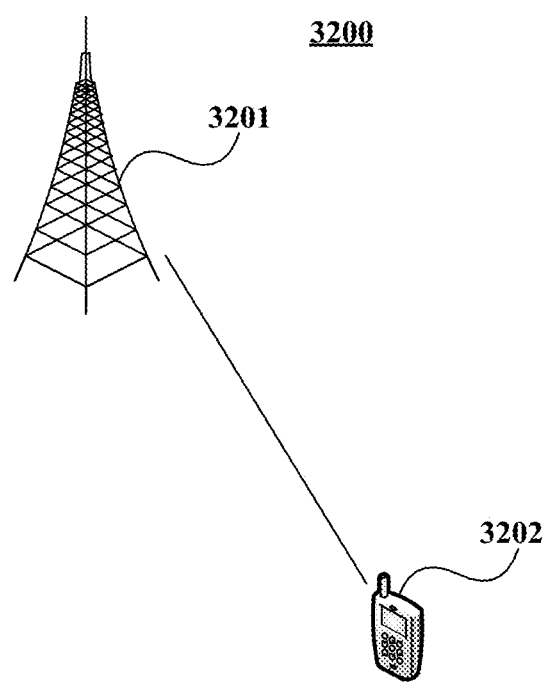
FIG. 32 is a schematic diagram of the communication system of an embodiment of this disclosure.

The embodiments of this disclosure provide a communication system. FIG. 32 is a schematic diagram of the communication system 3200 of the embodiment of this disclosure. As shown in FIG. 32, the communication system 3200 includes a network device 3201 and a terminal equipment 3202. For the sake of simplification, description is given in FIG. 32 by taking only one terminal equipment and one network device as examples; however, the embodiments of this disclosure is not limited thereto.

In the embodiments of this disclosure, existing services or services that may be implemented in the future may be performed between the network device 3201 and the terminal equipment 3202. For example, such services may include but not limited to an enhanced mobile broadband (eMBB), massive machine type communication (mMTC), ultra-reliable and low-latency communication (URLLC), and vehicle to everything communication (V2X), etc.

In some embodiments, the network device 3201 transmits indication information to the terminal equipment 3202, the indication information indicating that uplink control information being related to at least two TRPs, and the terminal equipment 3202 receives the indication information, and transmits uplink control information according to the indication information.

In some embodiments, the terminal equipment 3202 is configured to carry out the method of the embodiments of the first aspect, and the network device 3201 is configured to carry out the method of the embodiments of the second aspect, the contents of which being incorporated herein, and being not going to be described herein any further.

The embodiments of this disclosure further provides a terminal equipment. The terminal equipment may be, for example, a UE; however, this disclosure is not limited thereto, and it may also be another equipment.

Figure 33:
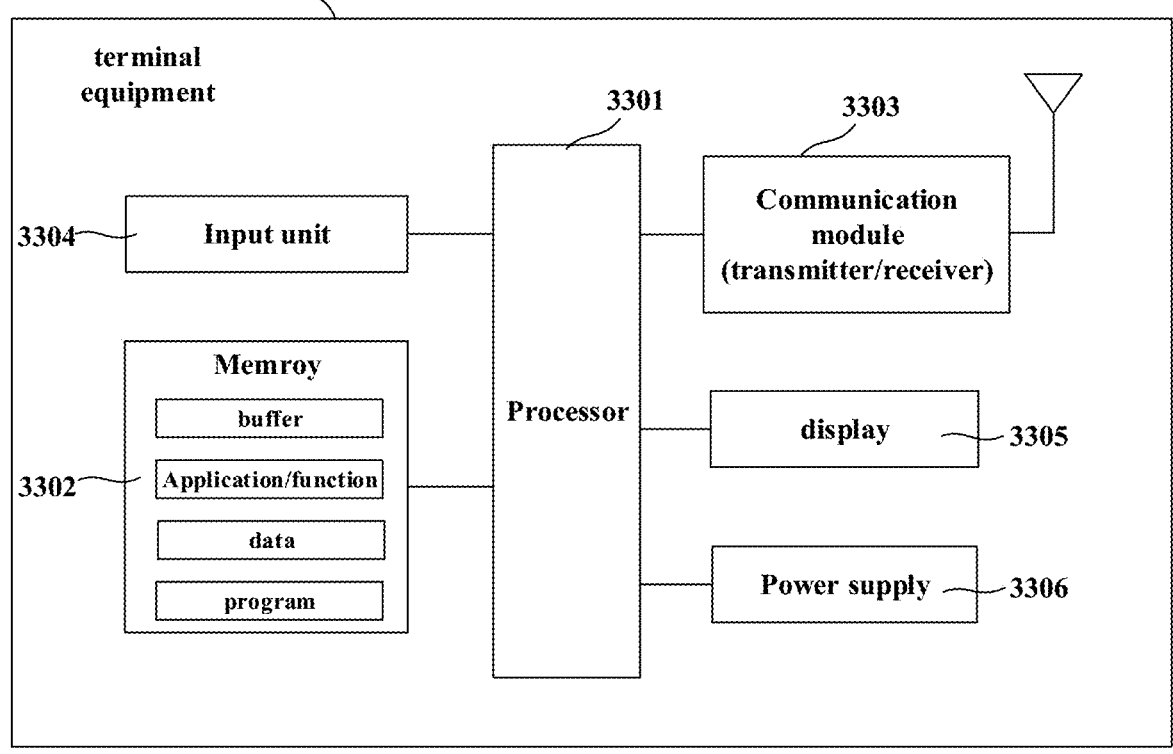
FIG. 33 is a schematic diagram of the terminal equipment of an embodiment of this disclosure.

FIG. 33 is a schematic diagram of the terminal equipment of the embodiment of this disclosure. As shown in FIG. 33, the terminal equipment 3300 may include a processor 3301 and a memory 3302, the memory 3302 storing data and a program and being coupled to the processor 3301. It should be noted that this figure is illustrative only, and other types of structures may also be used, so as to supplement or replace this structure and achieve a telecommunications function or other functions.

For example, the processor 3301 may be configured to execute a program to carry out the method for transmitting uplink control information as described in the embodiments of the first aspect.

As shown in FIG. 33, the terminal equipment 3300 may further include a communication module 3303, an input unit 3304, a display 3305, and a power supply 3306; wherein functions of the above components are similar to those in the related art, which shall not be described herein any further. It should be noted that the terminal equipment 3300 does not necessarily include all the parts shown in FIG. 33, and the above components are not necessary. Furthermore, the terminal equipment 3300 may include parts not shown in FIG. 33, and the related art may be referred to.

The embodiments of this disclosure further provides a network device, which may be, for example, a gNB. However, this disclosure is not limited thereto, and it may also be another network device.

Figure 34:
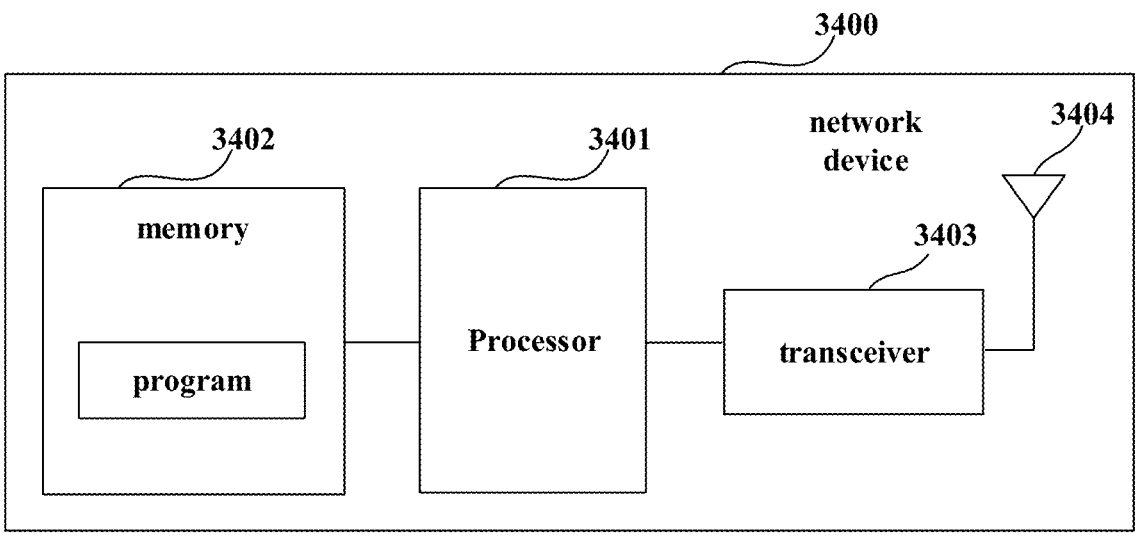
FIG. 34 is a schematic diagram of the network device of an embodiment of this disclosure.

FIG. 34 is a schematic diagram of a structure of the network device of the embodiment of this disclosure. As shown in FIG. 34, the network device 3400 may include a processor 3401 (such as a central processing unit (CPU)) and a memory 3402, the memory 3402 being coupled to the processor 3401. The memory 3402 may store various data, and furthermore, it may store a program for information processing, and execute the program under control of the processor 3401.

For example, the processor 3410 may be configured to execute a program to carry out the method for indicating transmission of uplink control information as described in the embodiments of the second aspect.

Furthermore, as shown in FIG. 34, the network device 3400 may further include a transceiver 3403, and an antenna 3404, etc. Functions of the above components are similar to those in the related art, and shall not be described herein any further. It should be noted that the network device 3400 does not necessarily include all the parts shown in FIG. 34, and furthermore, the network device 3400 may include parts not shown in FIG. 34, and the related art may be referred to.

An embodiment of this disclosure provides a computer readable program, which, when executed in a terminal equipment, will cause a computer to carry out the method for transmitting uplink control information as described in the embodiments of the first aspect in the terminal equipment.

An embodiment of this disclosure provides a storage medium storing a computer readable program, which will cause a computer to carry out the method for transmitting uplink control information as described in the embodiments of the first aspect in a terminal equipment.

An embodiment of this disclosure provides a computer readable program, which, when executed in a network device, will cause a computer to carry out the method for indicating transmission of uplink control information as described in the embodiments of the second aspect in the network device.

An embodiment of this disclosure provides a storage medium storing a computer readable program, which will cause a computer to carry out the method for indicating transmission of uplink control information as described in the embodiments of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. A method for transmitting uplink control information, wherein the method includes:

transmitting uplink control information by a terminal equipment, the uplink control information (PUCCH) being related to at least two TRPs.

2. The method according to supplement 1, wherein the uplink control information being related to at least two TRPs refers to that, former N1 symbols of the uplink control information are related to a first TRP of the at least two TRPs, and next N1 symbols of the uplink control information are related to a second TRP of the at least two TRPs.

3. The method according to supplement 2, wherein remaining symbols of the uplink control information are related respectively to the first TRP and the second TRP in units of N1 symbols.

4. The method according to supplement 2, wherein the number of N1 is at least one of the following: 1, 2.

5. The method according to supplement 1, wherein the uplink control information being related to at least two TRPs refers to that, in a slot associated with the uplink control information, a first time domain part of the uplink control information is related to a first TRP of the at least two TRPs, and remaining time domain part of the uplink control information is related at to a second TRP of the at least two TRPs.

6. The method according to supplement 1, wherein the uplink control information being related to at least two TRPs refers to that, former N2 slots of the uplink control information is related to a first TRP of the at least two TRPs, and next N2 slots of the uplink control information is related to a second TRP of the at least two TRPs.

7. The method according to supplement 6, wherein remaining slots of the uplink control information are related respectively to the first TRP and the second TRP in units of N2 slots.

8. The method according to supplement 6, wherein the number of N2 is at least one of the following: 1, 2, 4, 8.

9. The method according to supplement 1, wherein that the terminal equipment transmits the uplink control information includes:

performing frequency hopping by the terminal equipment on transmission of the uplink control information according to the at least two TRPs.

10. The method according to supplement 9, wherein the according to at least two TRPs refers to, according to a transmission occasion, or a repetition, or a time-frequency resource associated with one of the at least two TRPs.

11. The method according to supplement 9 or 10, wherein the performing frequency hopping refers to performing frequency hopping according to a slot where the uplink control information is located.

12. The method according to supplement 9 or 10, wherein the performing frequency hopping refers to performing frequency hopping within a slot where the uplink control information is located according to a time domain part corresponding to the uplink control information.

13. The method according to supplement 9, wherein frequency hopping patterns associated with TRPs in the at least two TRPs are identical.

13a. The method according to supplement 13, wherein the frequency hopping pattern is at least one of the following:

whether frequency hopping occurs;
frequency hopping mode;
the number of frequency hopping;
a starting position of frequency hopping;
a frequency hopping offset.

14. The method according to supplement 1, wherein the method further includes:

determining a length of an orthogonal cover code of the uplink control information according to a time domain length of a time-domain resource, a repetition or a transmission occasion related to the uplink control information; wherein the time-domain resource, the repetition or the transmission occasion is related to one of the at least two TRPs.

15. The method according to supplement 1, wherein the method further includes:

generating a sequence corresponding to the uplink control information according to the at least two TRPs.

16. The method according to supplement 1, wherein the method further includes:

receiving indication information transmitted by a network device, the indication information indicating that the uplink control information is related to at least two TRPs.

17. The method according to supplement 16, wherein the indication information is contained in RRC signaling, parameters indicated by the RRC signaling are common for all resources belong to the same PUCCH format (that is, the indicated parameters that are common for all PUCCH resources of a format).

17a. The method according to supplement 16, wherein the indication information is contained in RRC signaling, the RRC signaling acting on a PUCCH resource with an ID.

18. The method according to supplement 17, wherein the PUCCH format refers to one of the following:

PUCCH format 0;
PUCCH format 1;
PUCCH format 2;
PUCCH format 3;
PUCCH format 4.

19. The method according to any one of supplements 1-18, wherein the TRP is equivalent to at least one of the following concepts:

a transmission configuration indication state;
a spatial relation;
a reference signal;
a reference signal group;
an SRS resource group;
a spatial domain filter;
a power control parameter; and
a group of time alignment (TA) related parameters.

20. The method according to any one of supplements 1-18, wherein a format of a resource corresponding to the uplink control information is one of the following:

PUCCH format 0;
PUCCH format 1;
PUCCH format 2;
PUCCH format 3;
PUCCH format 4.

21. A method for indicating transmission of uplink control information, wherein the method includes:

transmitting indication information by a network device to a terminal equipment, the indication information indicating that uplink control information is related to at least two TRPs.

22. The method according to supplement 21, wherein the uplink control information being related to at least two TRPs refers to that, former N1 symbols of the uplink control information are related to a first TRP of the at least two TRPs, and next N1 symbols of the uplink control information are related to a second TRP of the at least two TRPs.

23. The method according to supplement 22, wherein remaining symbols of the uplink control information are related respectively to the first TRP and the second TRP in units of N1 symbols.

24. The method according to supplement 22, wherein the number of N1 is at least one of the following: 1, 2.

25. The method according to supplement 21, wherein the uplink control information being related to at least two TRPs refers to that, in a slot associated with the uplink control information, a first time domain part of the uplink control information is related to a first TRP of the at least two TRPs, and remaining time domain part of the uplink control information is related at to a second TRP of the at least two TRPs.

26. The method according to supplement 21, wherein the uplink control information being related to at least two TRPs refers to that, former N2 slots of the uplink control information is related to a first TRP of the at least two TRPs, and next N2 slots of the uplink control information is related to a second TRP of the at least two TRPs.

27. The method according to supplement 26, wherein remaining slots of the uplink control information are related respectively to the first TRP and the second TRP in units of N2 slots.

28. The method according to supplement 26, wherein the number of N2 is at least one of the following: 1, 2, 4, 8.

29. The method according to supplement 21, wherein the indication information is included in RRC signaling, parameters indicated by the RRC signaling are common for all resource belong to the same PUCCH format (that is, the indicated parameters that are common for all PUCCH resources of a format).

30. The method according to supplement 29, wherein the PUCCH format refers to one of the following:

PUCCH format 0;
PUCCH format 1;
PUCCH format 2;
PUCCH format 3;
PUCCH format 4.

31. The method according to any one of supplements 21-30, wherein the TRP is equivalent to at least one of the following concepts:

a transmission configuration indication state;
a spatial relation;
a reference signal;
a reference signal group;
an SRS resource group;
a spatial domain filter;
a power control parameter; and
a group of time alignment (TA) related parameters.

32. A terminal equipment, including a memory and a processor, the memory storing a computer program, and the processor being configured to execute the computer program to carry out the method as described in any one of supplements 1-20.

33. A network device, including a memory and a processor, the memory storing a computer program, and the processor being configured to execute the computer program to carry out the method as described in any one of supplements 21-31.

34. A communication system, including a terminal equipment and a network device, wherein, the terminal equipment is configured to carry out the method as described in any one of supplements 1-20, and the network device is configured to carry out the method as described in any one of supplements 21-31.

What is claimed is:

1. An apparatus for transmitting uplink control information, the apparatus comprises:

a receiver configured to receive indication information transmitted by a network device, the indication information indicating that the uplink control information is related to at least two spatial relations or at least two power control parameters; and a transmitter configured to transmit the uplink control information, by using the at least two spatial relations or at least two power control parameters, wherein the indication information applies to a PUCCH resource with an ID.

2. The apparatus according to claim 1, wherein, the at least two spatial relations or at least two power control parameters include a first spatial relation or a first power control parameter and a second spatial relation or a second power control parameter, the first spatial relation or the first power control parameter is used to transmit first N1 symbols of the uplink control information, and the second spatial relation or the second power control parameter is related used to transmit second N1 symbols of the uplink control information.

3. The apparatus according to claim 2, wherein remaining symbols of the uplink control information are related respectively to the first spatial relation or the first power control parameter and the second spatial relation or the second power control parameter in units of N1 symbols.

4. The apparatus according to claim 1, the at least two spatial relations or at least two power control parameters include a first spatial relation or a first power control parameter and a second spatial relation or a second power control parameter, the first spatial relation or the first power control parameter is related, in a slot with which the uplink control information associated, a first time domain portion of the uplink control information, and the second spatial relation or the second power control parameter is related to remaining time domain portion of the uplink control information.

5. The apparatus according to claim 1, wherein, the at least two spatial relations or at least two power control parameters includes a first spatial relation or a first power control parameter and a second spatial relation or a second power control parameter, the first spatial relation or the first power control parameter is related to first N2 slots of the uplink control information, and the second spatial relation or the second power control parameter is related to second N2 slots of the uplink control information.

6. The apparatus according to claim 5, wherein remaining slots of the uplink control information are related respectively to the first spatial relation or the first power control parameter and the second spatial relation or the second power control parameter in units of N2 slots.

7. The apparatus according to claim 1, wherein the transmitter performs frequency hopping on transmission of the uplink control information according to the at least two spatial relations or at least two power control parameters.

8. The apparatus according to claim 7, wherein the frequency hopping is performed according to a slot where the uplink control information is located.

9. The apparatus according to claim 7, wherein the frequency hopping is performed at a slot where the uplink control information is located according to a time domain portion corresponding to the uplink control information.

10. The apparatus according to claim 1, wherein the transmitter performs frequency hopping on transmission of the uplink control information according to at least one of a transmission occasion, a repetition, and a time-frequency resource associated with one of the at least two spatial relations or at least two power control parameters.

11. The apparatus according to claim 1, wherein the uplink control information is PUCCH repetition.

12. The apparatus according to claim 1, wherein, the apparatus further comprises:

a processor, configured to determine a length of an orthogonal cover code of the uplink control information according to a time domain length of a time-domain resource, a repetition or a transmission occasion related to the uplink control information; wherein the time-domain resource, the repetition or the transmission occasion is related to one of the at least two spatial relations or at least two power control parameters.

13. The apparatus according to claim 1, wherein, the apparatus further comprises:

a processor, configured to generate a sequence corresponding to the uplink control information according to the at least two spatial relations or at least two power control parameters.

14. The apparatus according to claim 1, wherein the indication information is contained in RRC signaling, parameters indicated by the RRC signaling are common for all resources of a PUCCH format.

15. The apparatus according to claim 1, wherein the indication information is contained in RRC signaling, the RRC signaling acting on a PUCCH resource with an ID.

16. The apparatus according to claim 1, wherein the at least two spatial relations or at least two power control parameters are equivalent to at least one of the following:

a transmission configuration indication state;

a spatial relation;

a reference signal;

a set of reference signal;

an SRS resource group;

a spatial domain filter;

a power control parameter; and a group of time alignment (TA) related parameters.

17. The apparatus according to claim 1, wherein a format of a resource corresponding to the uplink control information is at least one of the following:

PUCCH format 0;

PUCCH format 1;

PUCCH format 2;

PUCCH format 3;

PUCCH format 4.

18. An apparatus for indicating transmission of uplink control information, wherein the apparatus comprises:

a transmitter configured to transmit indication information to a terminal equipment, the indication information indicating that uplink control information is related to at least two spatial relations or at least two power control parameters, and a receiver configured to receive the uplink control information;

wherein the indication information applies to a PUCCH resource with an ID.

19. The apparatus according to claim 18, wherein the at least two spatial relations or at least two power control parameters are equivalent to at least one of the following:

a transmission configuration indication state;

a spatial relation;

a reference signal;

a set of reference signal;

an SRS resource group;

a spatial domain filter;

a power control parameter; and a group of time alignment (TA) related parameters.

* * * * *